United States Patent [19]
Benson et al.

[11] Patent Number: 5,157,893
[45] Date of Patent: Oct. 27, 1992

[54] COMPACT VACUUM INSULATION

[75] Inventors: David K. Benson, Golden; Thomas F. Potter, Denver, both of Colo.

[73] Assignee: Midwest Research Institute, Kansas City, Mo.

[21] Appl. No.: 535,782

[22] Filed: Jun. 12, 1990

Related U.S. Application Data

[63] Continuation-in-part of Ser. No. 181,926, Apr. 15, 1988.

[51] Int. Cl.$^5$ .............................................. E04C 2/32
[52] U.S. Cl. ........................................ 52/792; 52/791; 52/799; 52/806; 52/814; 52/404
[58] Field of Search ............... 52/791, 792, 799, 800, 52/802, 806, 809, 814, 404, 406; 428/138, 256; 427/54.1

[56] References Cited

U.S. PATENT DOCUMENTS

| | | | |
|---|---|---|---|
| 1,239,770 | 9/1917 | Coleman . | |
| 1,770,200 | 3/1929 | Comstock | 52/791 X |
| 2,132,642 | 10/1938 | Parsons | 52/799 X |
| 2,173,815 | 9/1939 | Susz et al. | 52/792 X |
| 2,221,309 | 11/1940 | Gazelle . | |
| 2,233,190 | 2/1941 | Amorosi . | |
| 2,989,156 | 6/1961 | Brooks et al. . | |
| 3,151,365 | 9/1964 | Glaser et al. | |
| 3,151,712 | 10/1964 | Jackson . | |
| 3,152,033 | 10/1964 | Black et al. | 428/119 X |
| 3,161,265 | 12/1964 | Matsch et al. . | |
| 3,179,549 | 4/1965 | Strong et al. . | |
| 3,321,826 | 5/1967 | Lavy | 52/799 X |
| 3,525,663 | 8/1970 | Hale | 52/792 X |
| 3,647,606 | 3/1972 | Notaro . | |
| 4,270,329 | 6/1981 | Moore . | |
| 4,444,821 | 4/1984 | Young et al. . | |
| 4,468,423 | 8/1984 | Hall . | |
| 4,477,486 | 10/1984 | Boaz | 427/541 |
| 4,486,482 | 12/1984 | Kobayashi et al. . | |
| 4,683,154 | 7/1987 | Benson et al. . | |
| 4,810,553 | 3/1989 | Lombardozzi | 52/792 X |
| 5,028,474 | 7/1991 | Czaplicki | 52/799 X |

FOREIGN PATENT DOCUMENTS

| | | |
|---|---|---|
| 0047725 | 12/1985 | European Pat. Off. . |
| 3618976A1 | 2/1987 | Fed. Rep. of Germany . |
| 683855 | 12/1952 | United Kingdom . |
| 2079415A | 1/1982 | United Kingdom . |

OTHER PUBLICATIONS

Kurt Reinhard, Development and Testing of Vacuum Super Insulation for Use in Residential and Industrial Construction, ERNO Space Technology GmbH, Bremen, West Germany, Mar. 1977.
Kurt Reinhard, Untitled Report ERNO Space Technology GmbH.

Primary Examiner—David A. Scherbel
Assistant Examiner—Kien Nguyen
Attorney, Agent, or Firm—Ken Richardson

[57] ABSTRACT

Improved compact insulation panel is provided which is comprised of two adjacent metal sheets spaced close together with a plurality of spherical, or other discretely shaped, glass or ceramic beads optimally positioned between the sheets to provide support and maintain the spacing between the metal sheets when the gases therebetween are evacuated to form a vacuum. These spherical glass beads provide the maximum support while minimizing thermal conductance. In its preferred embodiment; these two metal sheets are textured with ribs or concave protrusions in conjunction with the glass beads to maximize the structural integrity of the panels while increasing the spacing between beads, thereby reducing the number of beads and the number of thermal conduction paths. Glass or porcelain-enameled liners in combination with the glass spacers and metal sidewalls effectively decrease thermal conductivity, and variious laminates, including wood, porcelain-enameled metal, and others effectively increase the strength and insulation capabilities of the panels. Also, a metal web is provided to hold the spacers in place, and strategic grooves are shown to accommodate expansion and contraction or shaping of the panels.

13 Claims, 13 Drawing Sheets

COMPACT VACUUM INSULATION

CONTRACTUAL ORIGIN OF INVENTION

The United States Government has rights in this invention under Contract No. DE-AC02-83CH10093 between the U.S. Department of Energy and the Solar Energy Research Institute, a Division of Midwest Research Institute.

CROSS-REFERENCE TO OTHER APPLICATIONS

This patent application is a continuation-in-part of U.S. patent application Ser. No. 07/181,926, filed Apr. 15, 1988, and entitled Compact Vacuum Insulation.

BACKGROUND OF THE INVENTION

1. Field of the Invention

The present invention is generally related to insulation panels, and more specifically to vacuum insulation panels that have a high degree of resistance to heat transfer and are thin and bendable to form curved and other shaped insulation panels, applications of such panels, and methods of making same.

2. Description of the Prior Art

There is nothing new about the generic concept of insulation for inhibiting heat transfer or in the concept of using vacuum panels for such insulation. There is, however, a rapidly emerging need for much improved insulation in terms of a combination of better insulation effectiveness, lighter weight, thinner, more durable, and more bendable or formable insulation products. The needs for such better insulation products emanate from such diverse areas as space-related vehicles and equipment, extremely low-temperature cryogenic vessels and pipes in scientific and industrial applications, and even common household appliances. For example, space vehicles and equipment to be launched into space need a very high quality of insulation to protect humans and equipment, yet there is no room for typically bulky insulated walls and panels.

State-of-the-art insulation for cryogenic applications is complex and expensive, and still has significant shortcomings. For example, an insulation structure known as "cryopumped insulation" is often used for insulating crogenic vessels and pipes. Such cryopumped insulation comprises many laminated layers of impervious material sealed at the edges and positioned adjacent the cryogenic material, e.g., liquid nitrogen. The liquid nitrogen is so cold that it causes the air in adjacent sealed spaces between the laminated sheets to liquify, thus leaving a partial vacuum in the spaces. This air-liquefying phenomenon occurs through adjacent layers at a sufficient depth into the laminated insulation structure such that heat transfer is inhibited by the adjacent vacuum layers created or "cryopumped" in the insulation structures.

While such "cryopumped" insulation works quite well at the extremely low temperatures of cryogenic materials, like liquid nitrogen, which are cold enough to liquify air, it does not insulate well in normal temperature ranges. Also, such "cryopumped" insulation is relatively thick and bulky, typically requiring several inches of thickness to be effective, and it is expensive and difficult to form into desired shapes or contours. Yet, prior to this invention, there were no thin, non-bulky, formable, yet equally effective alternatives.

On the domestic scene, consumers and governments are demanding that manufacturers of home appliances, such as refrigerators, water heaters, dishwashers, washing machines, clothes dryers, and the like, make these appliances much more energy efficient. For example, the California Energy Commission has mandated a 30% reduction in the energy use of refrigerator/freezers to be sold in that state in 1992. That mandated reduction in energy usage, while maintaining current dimensions, is not achievable without significant improvement in sidewall thermal efficiencies. Current technology could accommodate the reduction in heat transfer through the sidewalls of appliances by making insulated wall panels much thicker. However, since architectural designs of homes and apartments, door widths, and the like practically prohibit increasing external dimensions of home appliances, the alternative with conventional insulation is to decrease usable interior space. Such thicker walls and decreased interior space will meet with much consumer dissatisfaction and resistance.

Thinner insulation panels that improve insulating effectiveness would solve these problems, but ultra-thin, highly effective, and long-lasting insulation panels are not easy to make. In fact, prior to this invention, each of these criteria, i.e., ultra-thin, highly effective, and long-lasting, has been mutually exclusive of at least one of the others.

There have been some notable attempts prior to this invention to improve insulation effectiveness with somewhat thinner panels. For example, U.S. Pat. No. 2,989,156, issued to F. Brooks et al., discloses an insulation panel comprising an evacuated space between metal sheets, which evacuated space is filled with perlite powder. U.S. Pat. No. 3,151,365, issued to P. Glaser et al., shows the use of a mixture of fine carbon black particles and other fine particles filling an evacuated, enclosed structure, intermediate foil radiation shields, and an emissivity-reducing coating of silver. The H. Strong et al., patent, U.S. Pat. No. 3,179,549, uses a mat of very fine, oriented glass fibers sealed inside an evacuated, welded metal envelope. The vacuum used is only about $10^{-4}$ atmospheres ($10^{-2}$ Torr), and it requires a fiber mat of sufficient density and thickness to be opaque to thermal infrared radiation. U.S. Pat. No. 4,444,821, issued to J. Young et al., also discloses an evacuated panel filled with a glass fiber mat with plastic edge seal strips and a gettering material positioned in the evacuated chamber. This panel also specifies only a low-grade vacuum of about $10^{-2}$ Torr. The N. Kobayashi patent, U.S. Pat. No. 4,486,482, also uses a glass fiber mat inside a vacuum envelope made of welded stainless steel sheets. This glass mat is stitched with glass fibers that run perpendicular to the plane of the mat and are supposed to support the external atmospheric pressure load on the panel walls to keep them from collapsing.

A report entitled *Development and Testing of Vacuum Super Insulation for Use in Residential and Industrial Construction* by Kurt Reinhard of ERNO Space Technology GmbH, Bremen, West Germany, March 1977, described test results on four flexible vacuum insulation structures, each of which had an evacuated space enclosed by a metal (stainless steel) film and a vacuum of about 1 Torr down to $10^{-3}$ Torr. This report concluded that only one of the four embodiments showed any promise and rejected the others. The space in the first system, which was rejected, was filled with alternating layers of perlon gauze and aluminum foil. In the second system, which the report concluded showed some promise, the space was filled with irregular glass silk fibers. The third system, which was rejected, had some general similarities to several embodiments of the present invention, including two spaced apart rigid covering sheets with crimped indentations therein and rigid spacer blocks between the crimped sheets. A plurality of radiation protection films were positioned around the spacer blocks. In the fourth system, which was also rejected in the report, the stainless steel films were held apart by a plurality of thin, transversely arranged shiny corrugated sheets. The report concluded that the second system described above, which is similar to the H. Strong patent, was the only one that showed any promise. The others, including the third and fourth systems, which actually have more similarities to the present invention, were rejected as not having worthwhile potential.

At least some of the above-described prior art vacuum panels are no doubt more effective than conventional foam and fiberglass insulation panels. However, constructing a truly effective and long-lasting insulation panel is not easy and is not achieved by these prior art structures to the extent necessary to meet the needs described above. For example, the low-grade vacuums used in the prior art patents cannot achieve insulation efficiencies high enough for use in ultra-thin panels. Plastic or soldered edge seals cannot maintain a vacuum over an extended period of time, and they really cannot withstand high-temperature exposure or solar radiation exposure without serious degradation and outgassing. Metal envelopes with welded seams will hold the required vacuum, but it is virtually impossible to achieve the perfectly leak-free welds required for maintaining very high-grade vacuums over many years, when such welds have to be made in the presence of the billions of microscopically fine glass fibers and perlite particles used in some of the above-described prior art panels. A single particle or fiber intruding into the weld area could create a microscopic leak that would be very difficult to detect, but would nevertheless seriously compromise the lifetime of the vacuum inside the sealed insulation panel, thus compromising the usefulness of the panel.

The use of a vacuum results in the need for a sufficient structure inside the panel to hold the opposite panel walls from collapsing together. The glass fiber mats and perlite powders used in some of the prior art panels described above can serve that function. However, when vacuums are used, the inwardly directed sidewall pressures become very great so that such fiber mats and powders become more tightly compacted, thus offering more direct-heat conduction paths through the insulation panel than desired. Also, to be readily adaptable for a wide variety of uses, the insulation panel should be bendable around curves. However, bending the thicker prior art panels would almost certainly buckle or crimp one wall sheet of the panel into the other, thereby forming a "thermal short circuit" where one wall or sheet touches the other. In any bend, the inner sheet in the bend will tend to buckle when the outer sheet cannot stretch, because a perfect curve or bend would have a longer arc for the outer sheet than for the inner sheet. This problem would be worse for thicker panels where the arc of the outer sheet in the bend has a significantly larger radius than the arc of the inner sheet in the bend. Even if the glass fiber mats of such prior art panels as the H. Strong patent or the second system of the K. Reinhard report would physically hold the two opposite sheets apart, such a mat itself would be so compressed at the crimp or bend that it would virtually form the thermal short circuit itself.

The laser-sealed vacuum insulating window, now U.S. Pat. No. 4,683,154 invented by David K. Benson, one of the joint inventors of this invention, and C. Edwin Tracy, now U.S. Pat. No. 4,683,154, solved the problem of long-term sealing and structural support against collapse or thermal short circuit by laser-welding glass spacer beads between two glass sheets. However, that structure is quite thick, heavy, and fragile, being made with glass, and it is rigid, so it cannot be bent around curves. Therefore, while it is a highly efficient insulation panel, its utility is limited.

SUMMARY OF THE INVENTION

Accordingly, a general object of the present invention is to provide a highly effective, improved ultra-thin insulation panel.

Another object of this invention is to provide a highly effective, ultra-thin insulation panel that is durable, resistant to degradation, e.g., by high temperatures, corrosive fluids, and sunlight, and that is long-lasting and bendable without damage or significant loss of insulating capability.

Still another object of this invention is to provide a highly effective, ultra-thin insulation panel that has superior manufacturability, thus more consistent, dependable quality at a reasonable cost.

A further object of this invention is to provide ultra-thin compact vacuum insulation panel configurations and structures that are more versatile and more effective than prior art thin insulation panels for a wider variety of use requirements.

Yet another object of this invention to provide stronger and more durable thin wall structures for ultra-thin vacuum insulation panels than have been available before.

A more specific object of this invention is to provide a plurality of discrete glass or ceramic spacers between side sheets that form a vacuum chamber at predetermined spatial relationships to each other and a method of positioning such discrete spacers during assembly.

Another specific object of this invention is to provide effective glass, ceramic, or porcelain enameled metal spacer sheets for use alone or in combination with additional similar such spacer sheets in a high-grade evacuated chamber between two hard or rigid, but bendable metal sheets forming an ultra-thin insulation panel that is easy to manufacture and use.

Additional objects, advantages, and novel features of the invention are set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the improvement of the present invention, as embodied and broadly described herein, the article and apparatus of this invention may be a panel comprised of two adjacent thin metal sheet sidewalls spaced closely together with a thin spacer, preferably comprised of a plurality of spherical glass or ceramic beads or other discrete shapes, or, alternatively, a monolithic sheet with bulges from opposite surfaces coated with a glassy material, optimally positioned between the sheet sidewalls. These metal sheet sidewalls are sealed with a metal-to-metal seal or weld around the edges to form a vacuum chamber between the sidewalls, and the spherical glass or ceramic beads or other monolithic spacers provide the mechanical support to maintain the spacing between the metal sheets to prevent their collapse due to the vacuum, while minimizing thermal conductance. The glass beads or other shapes can, according to this invention, be formed or assembled in one or more monolithic sheets and positioned between the metal sheets. One preferred form of such monolithic sheet assemblies includes a sheet of metal web with a plurality of perforations in the web and with the glass or ceramic spherical nodules in the perforations protruding in opposite directions from the web. Another preferred form includes a sheet of metal web with a plurality of preformed nodules or elongated ribs coated with a glass or glassy material, such as porcelain. In its preferred embodiment, the improvement of the present invention provides the two outside metal sheets to be formed or textured with ribs or concave protrusions in conjunction with the glass beads or other shape spacers. Additional glass or glassy material linings may be positioned at the sidewall/spacer interfaces to improve structure and insulating characteristics. Other specific embodiments of the invention include the insulation panels configured in particular structures that enhance strength and flexibility, as well as useful configurations for particular purposes.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

Figure 1:
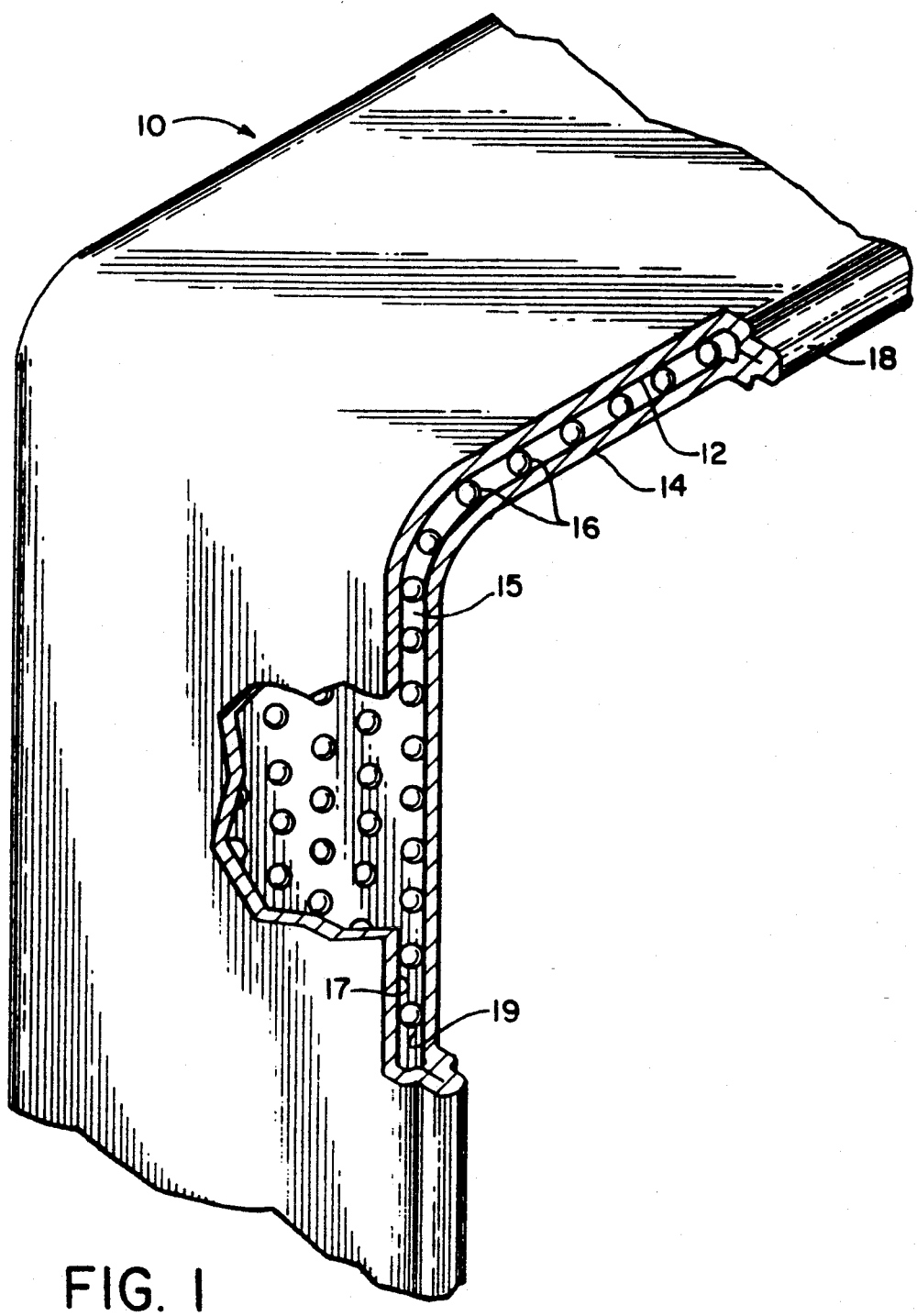
Figure 2:
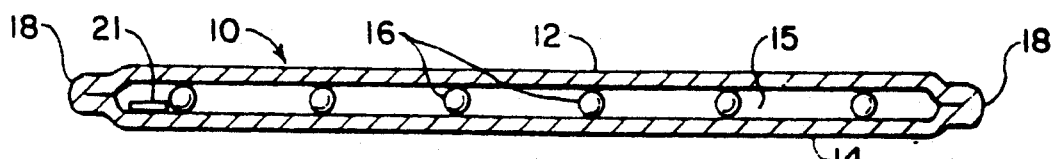
Figure 3:
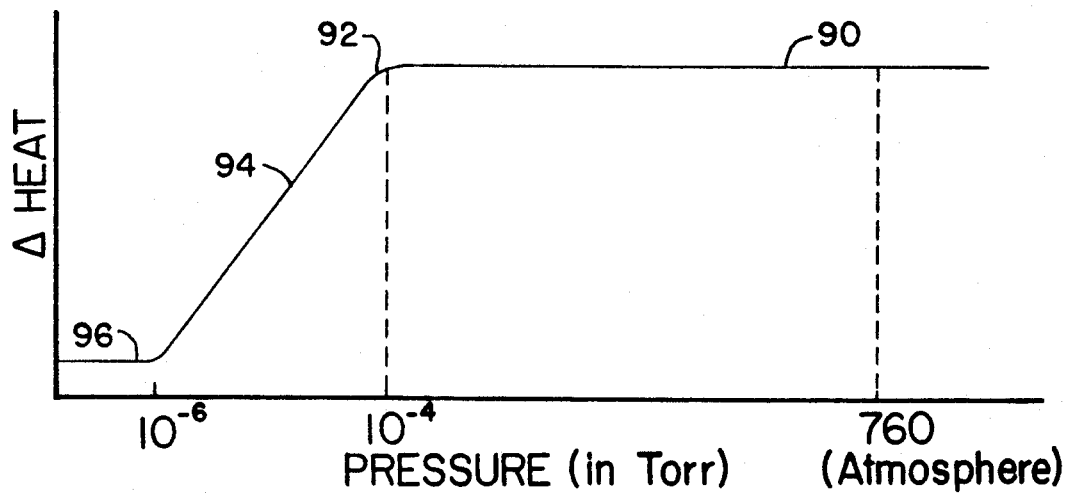
Figure 4:
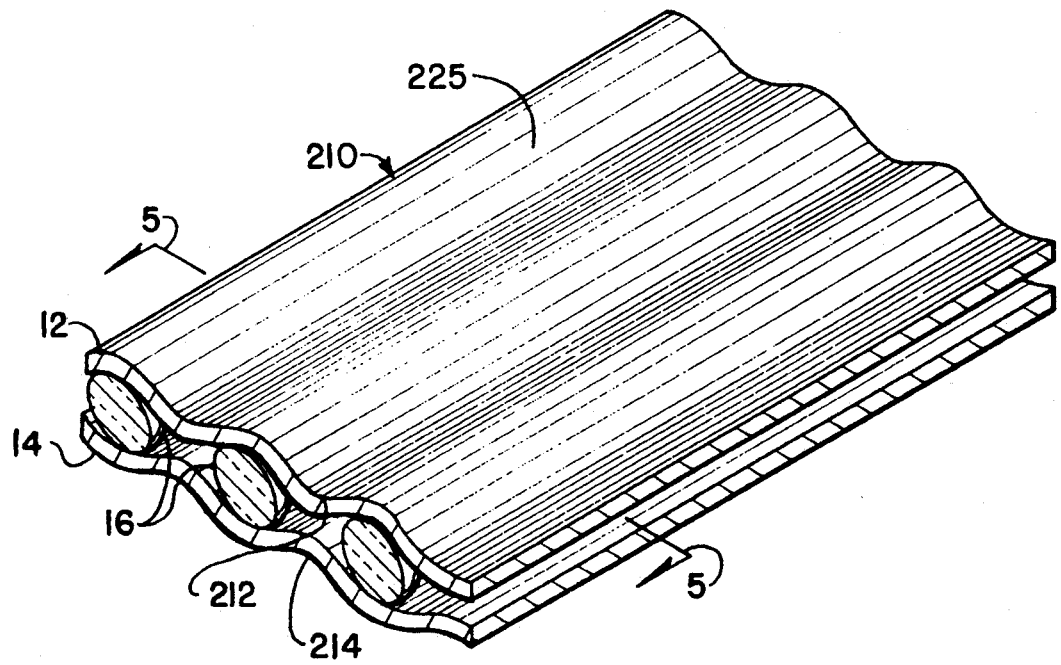
Figure 5:
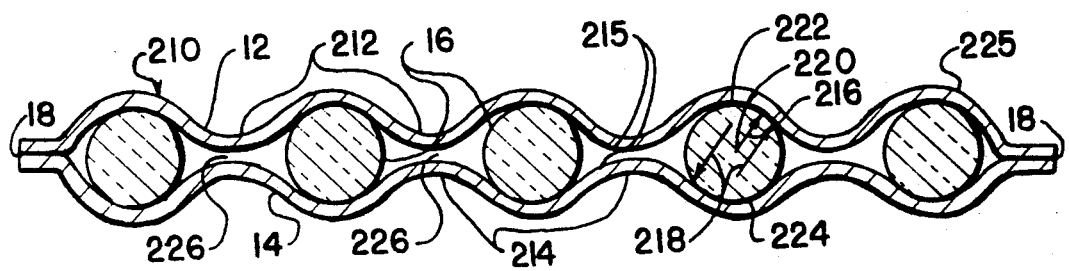
Figure 6:
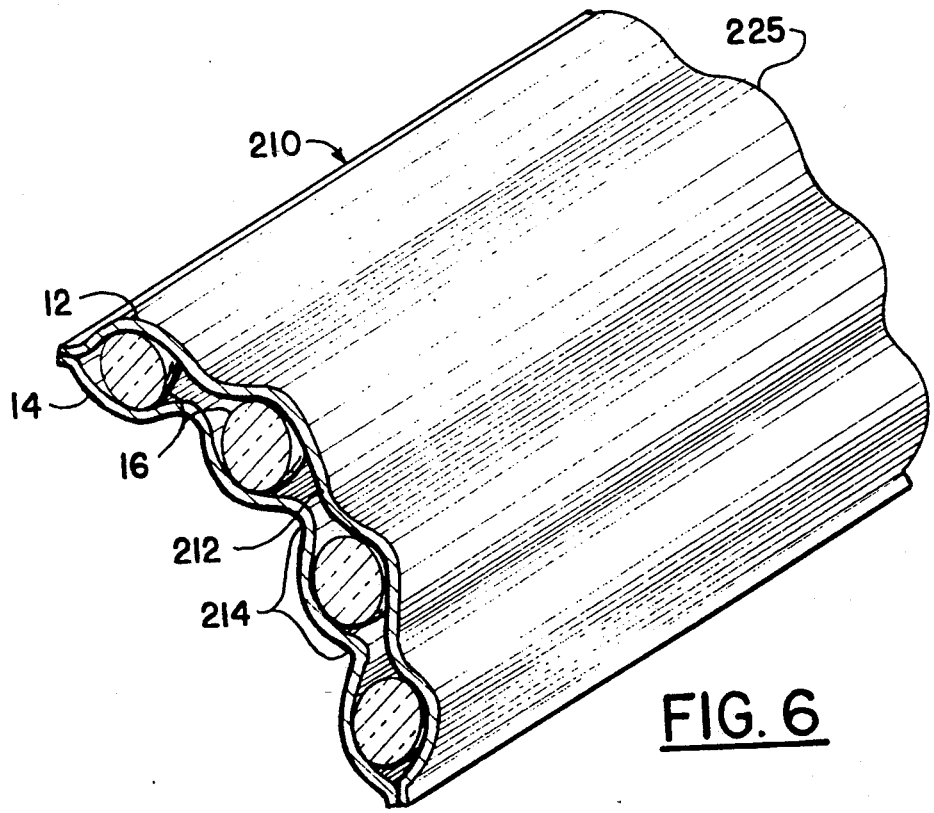
Figure 7:
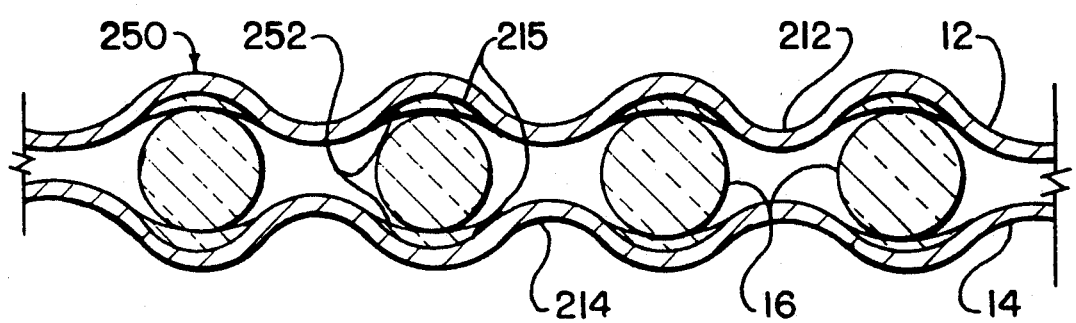
Figure 8:
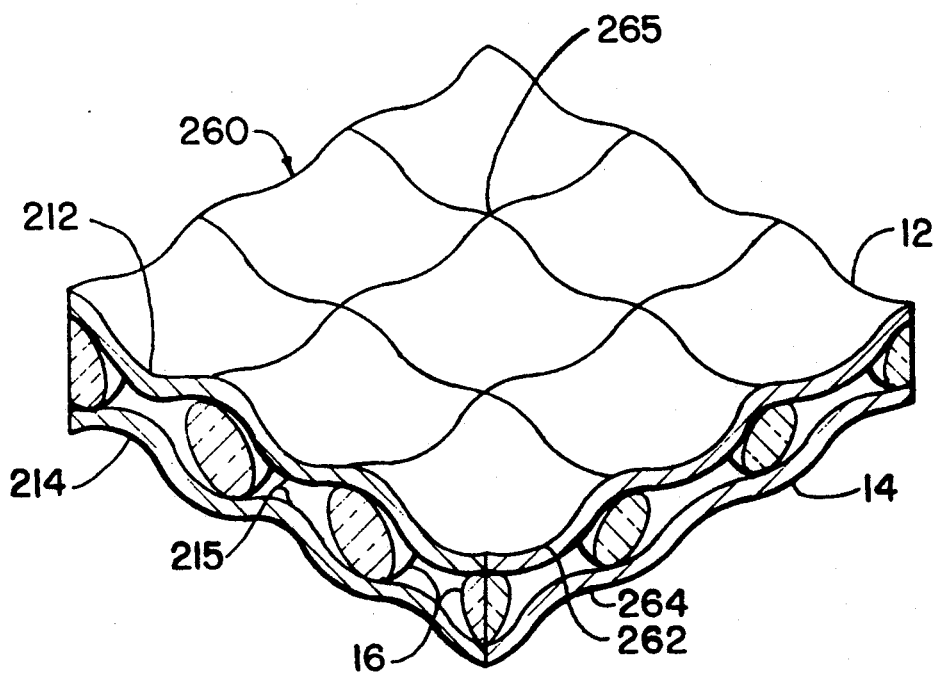
Figure 9:
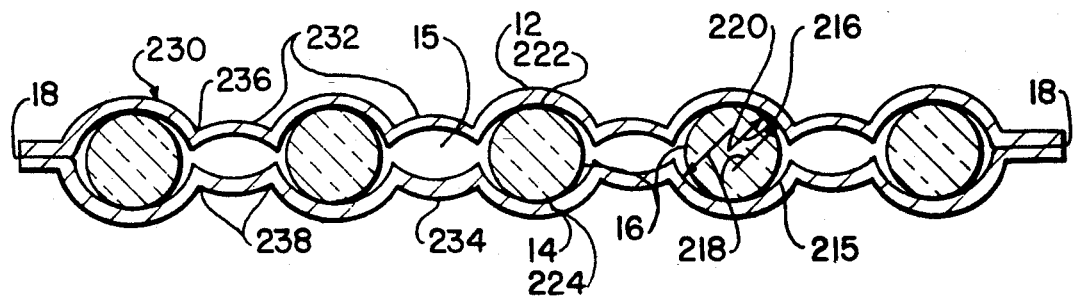
Figure 10:
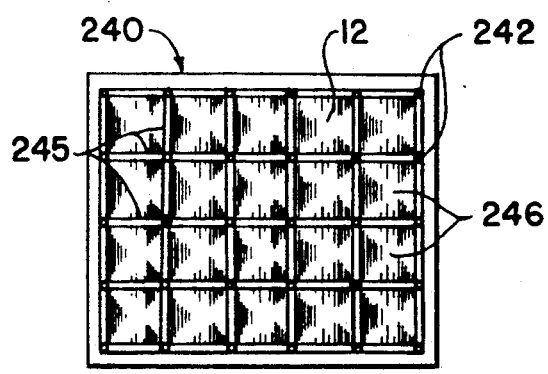
Figure 11:
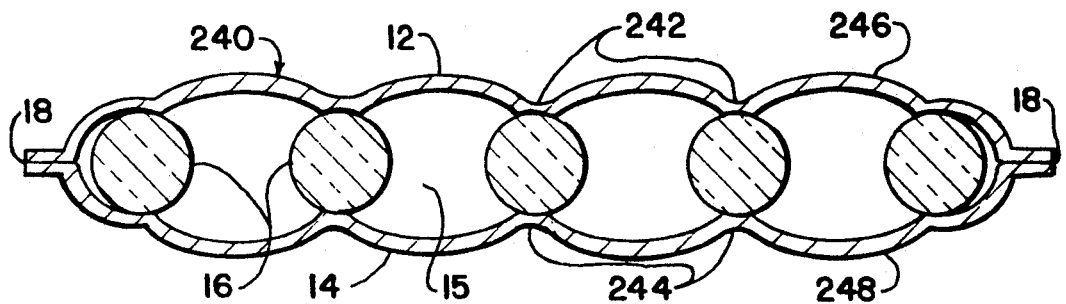
Figure 12:
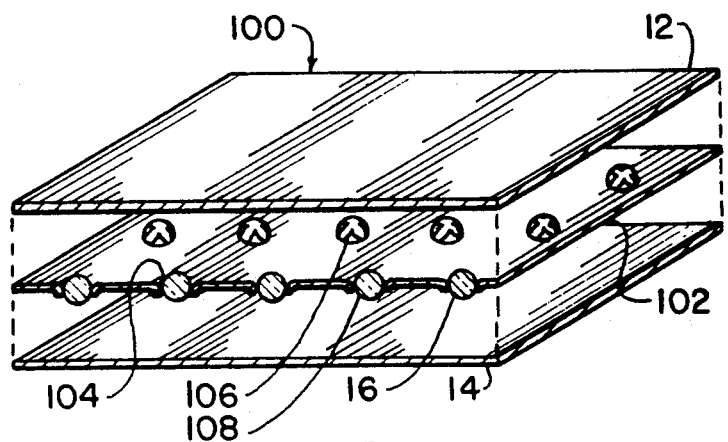
Figure 13:
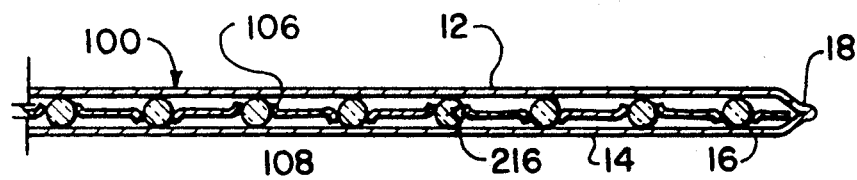
Figure 14:
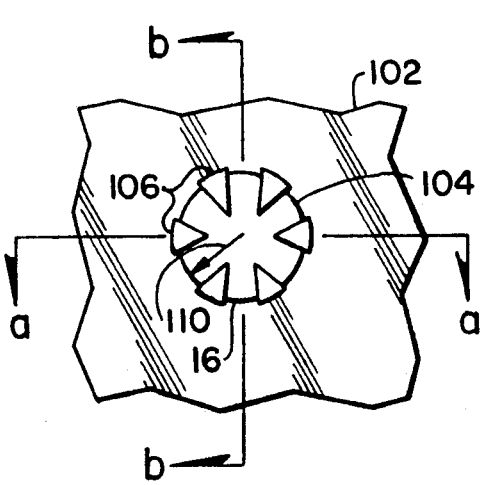
Figure 15:
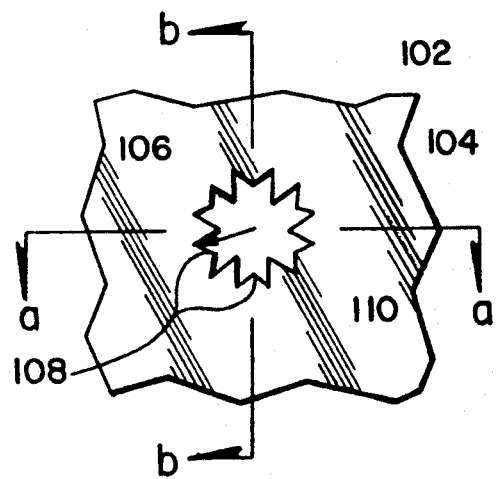
Figure 16A:
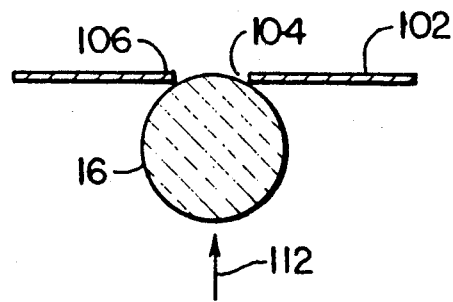
Figure 16B:
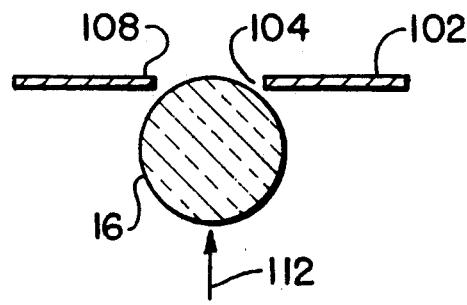
Figure 17A:
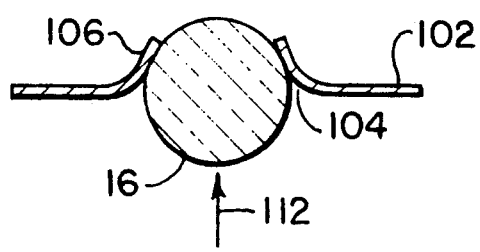
Figure 17B:
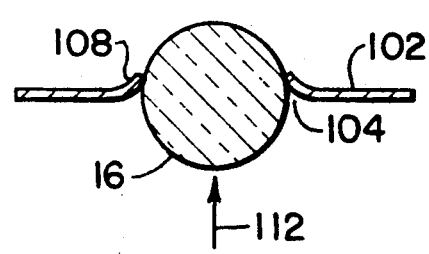
Figure 18A:
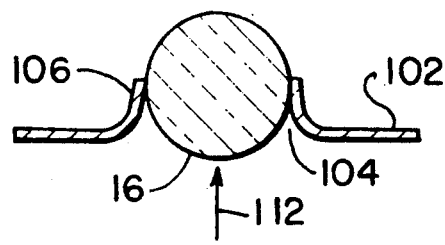
Figure 18B:
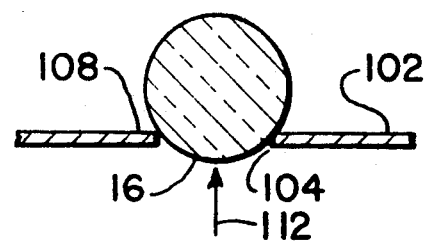
Figure 19A:
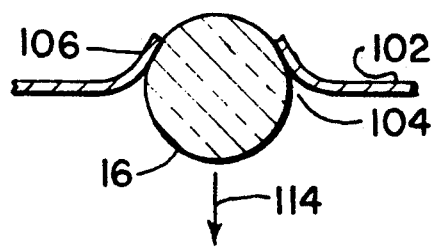
Figure 19B:
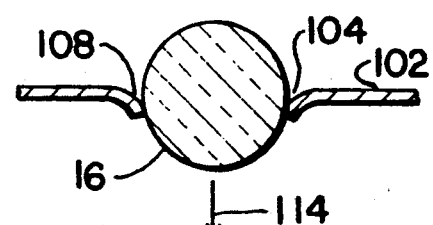
Figure 20:
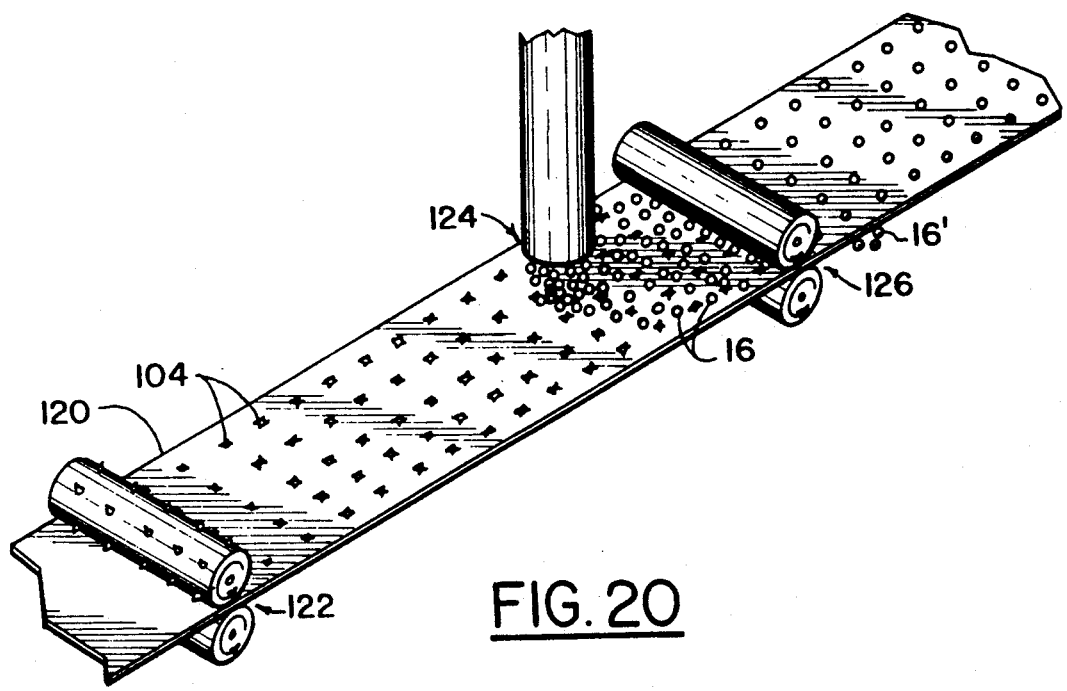
Figure 21:
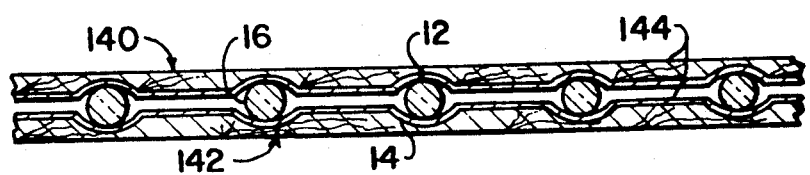
Figure 22:
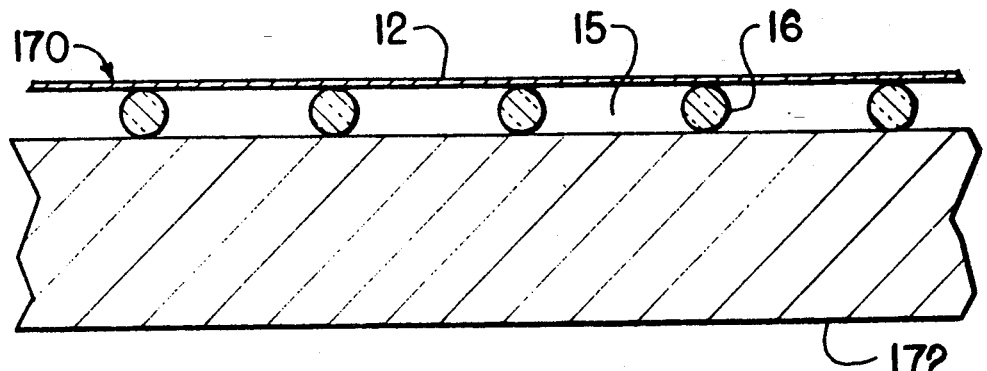
Figure 23:
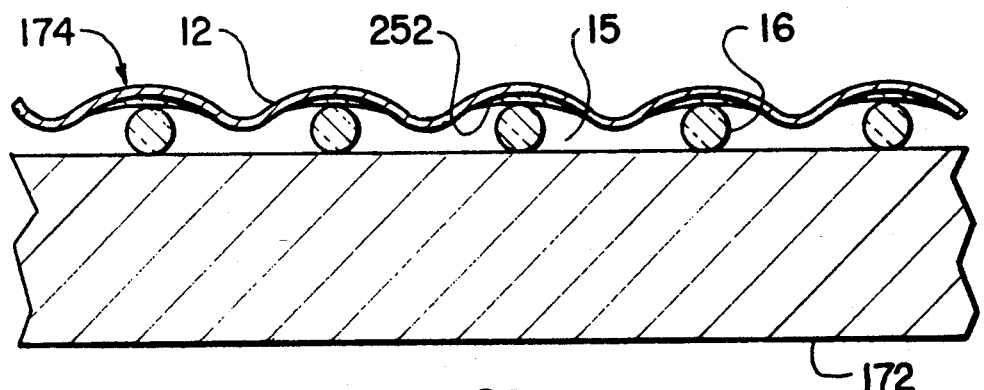
Figure 24:
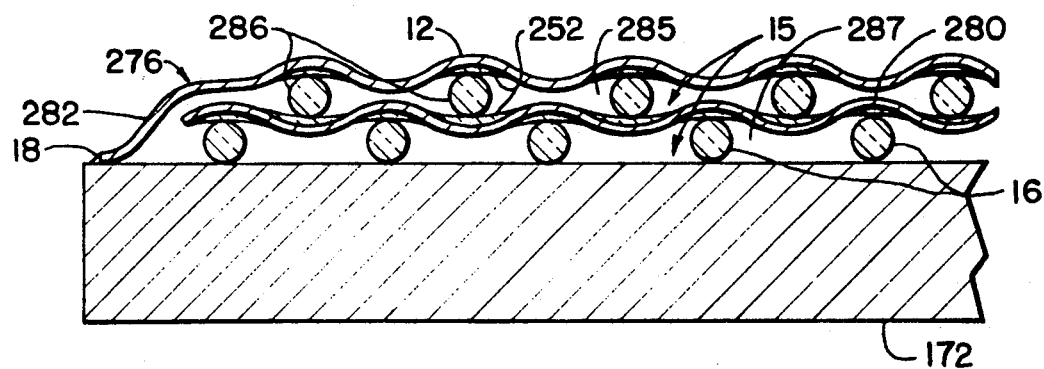
Figure 25:
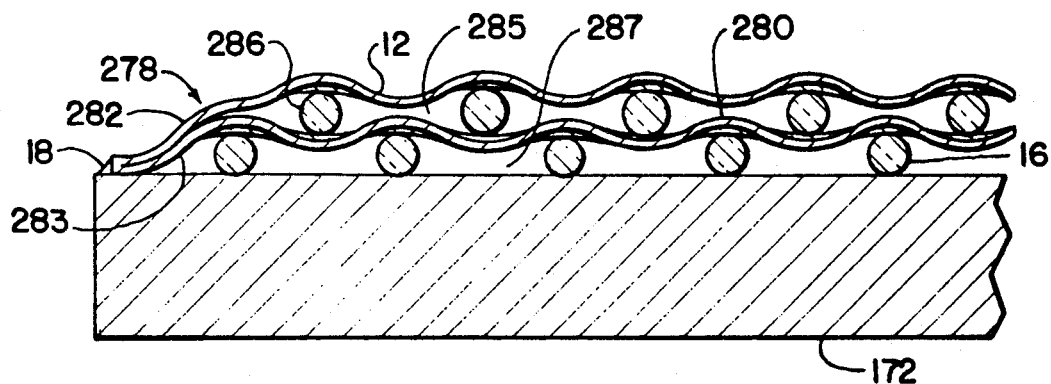

IN THE DRAWINGS:

FIG. 1 is a perspective view of a segment of an insulation panel constructed according to the basic invention with a portion of the edge seam and one side wall cut away to reveal the spacer beads positioned therein;

FIG. 2 is a cross-section of the basic structure of an insulation panel used according to the present invention;

FIG. 3 is a graph illustrating effective heat transfer in relation to vacuum in a panel constructed according to the principles of the present invention;

FIG. 4 is a perspective view of a segment of a preferred embodiment insulation panel wherein the outside metal sheets are textured with concave depressions between the spacers;

FIG. 5 is a cross-sectional view of the preferred embodiment insulation panel from FIG. 4 taken along the line 5—5;

FIG. 6 is a perspective view of a segment of the textured embodiment similar to that shown in FIGS. 4 and 5, but further formed into a curved insulation panel;

FIG. 7 is a cross-sectional view of another textured embodiment insulation panel similar to one shown in FIGS. 4 and 5, but with portions of the inside of the metal sheets adjacent the glass spacers filled with glass enamel;

FIG. 8 is a perspective view of a segment of another texture embodiment similar to the one shown in FIGS. 4 and 5, except that the concave depressions ran in two directions forming upward dimples at the spacers;

FIG. 9 is a cross-sectional view of another embodiment, insulation panel with the outside metal sheets textured with compression ribs between the spacers;

FIG. 10 is a top view of still another embodiment insulation panel with the outside metal sheets textured with convex bubbles between channels of compression divits which intersect at the spacers;

FIG. 11 is a cross-sectional view taken along line 11—11 of the textured insulation panel from FIG. 10, with the outside metal sheets textured with convex bubbles between compression divits at the spacers;

FIG. 12 is a fragmented, exploded view of a panel assembled according to another embodiment wherein the spacers are held within perforations in a web of thin metal foil;

FIG. 13 is a cross-sectional view of the insulation panel of FIG. 12;

FIG. 14 is a top view of a single spacer trapped within the perforation of the web of thin metal foil of the embodiment shown in FIGS. 12 and 13;

FIG. 15 is a top view of a single star-shaped perforation in the metal foil prior to entrapment of a spacer in accordance with that embodiment shown in FIGS. 12 and 13;

FIG. 16a is a cross-sectional view taken along line a—a of FIGS. 14, and 15, across the long tines of the star shaped perforation and is half of the first of a set of four pairs of sequential figures showing the insertion and entrapment of a spacer bead in the perforation of the thin metal foil in accordance with the embodiment shown in FIGS. 12 and 13, wherein the spacer bead has just been placed in contact with the long tines;

FIG. 16b is a cross-sectional view taken along line b—b of FIGS. 14, and 15, across the short tines of the star shaped perforation, and shows the same position as FIG. 16a wherein the spacer bead has just been placed in contact with the metal foil at the perforation but because of the long tines the spacer is held slightly away from the short tines;

FIG. 17a is a cross-sectional view taken along line a—a of FIGS. 14 and 15 across the long tines similar to FIG. 16a, but wherein the spacer bead has begun to be pressed upwards into the perforation;

FIG. 17b is a cross-sectional view taken along line b—b of FIGS. 14 and 15 across the short tines similar to FIG. 16b and corresponding to the same position as FIG. 17a, wherein the spacer bead has begun to be pressed upwards into the perforation;

FIG. 18a is a cross-sectional view taken along line a—a of FIGS. 14 and 15 across the long tines similar to FIG. 16a, but wherein the spacer bead has been pushed upward even further into the perforation;

FIG. 18b is a cross-sectional view taken along line b—b of FIGS. 14 and 15 across the short tines similar to FIG. 16b and corresponding to the same position as FIG. 18a, wherein the spacer bead has been pushed upward even further into the perforation;

FIG. 19a is a cross-sectional view taken along line a—a of FIGS. 14 and 15 across the long tines similar to FIG. 16a, but wherein the spacer bead has pushed back downwardly slightly to reach its final resting position;

FIG. 19b is a cross-sectional view taken along line b—b of FIGS. 14 and 15 across the short tines similar to FIG. 16b and corresponding to the same position as FIG. 19a, wherein the spacer bead has been pushed back downwardly slightly to reach its final resting position;

FIG. 20 is a perspective view of the assembly apparatus illustrating a method of automated fabrication of the bead entrapped perforated web of FIGS. 12 and 13;

FIG. 21 is a cross-sectional view of another embodiment of this invention wherein the insulation panel is contained or laminated within a superstrate;

FIG. 22 is a cross-sectional view of a variation of the insulation panel of this invention wherein one sidewall is a thicker structural substrate;

FIG. 23 is a cross-sectional view of a panel with a thicker structural substrate similar to that shown in FIG. 22, but with the one thin wall sheet corrugated and with glass fillers similar to that shown in FIG. 7;

FIG. 24 is a cross-sectional view of a panel similar to FIG. 23, but with an additional intermediate sheet and two layers of spacers;

FIG. 25 is a cross-sectional view of a panel similar to FIG. 24, but with the peripheral edges of both the intermediate and outer wall sheets welded to the thicker substrate to form two separate and distinct vacuum chambers, one layered over the other, adjacent the thicker substrate.

Figure 26:
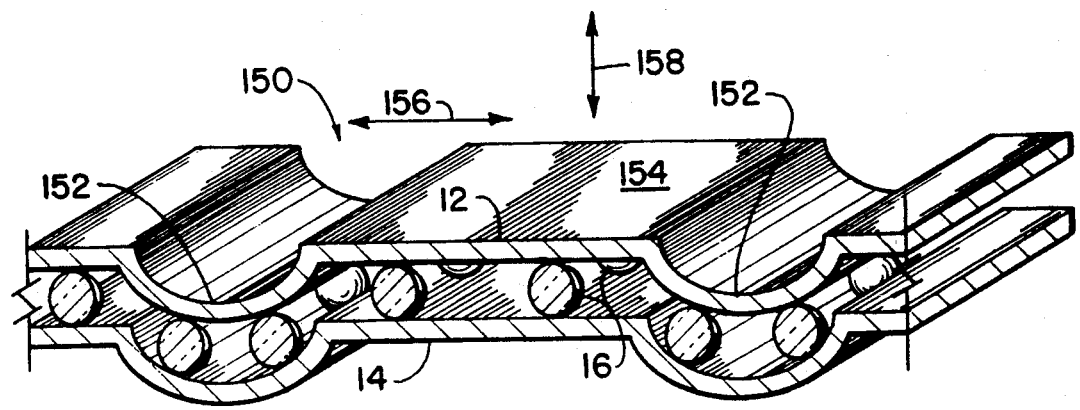
Figure 27:
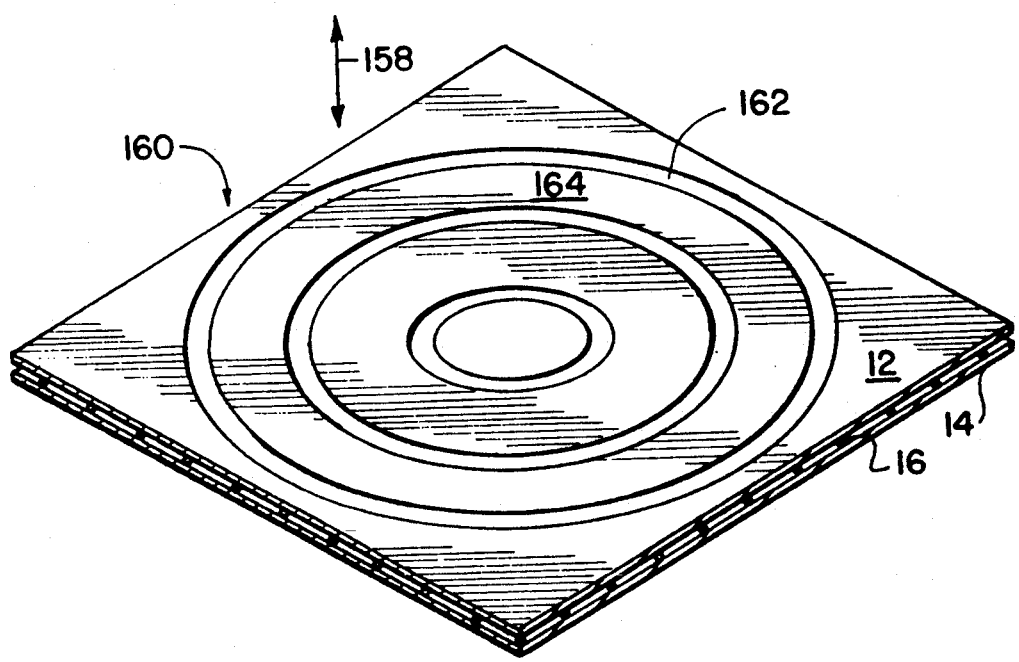
Figure 28:
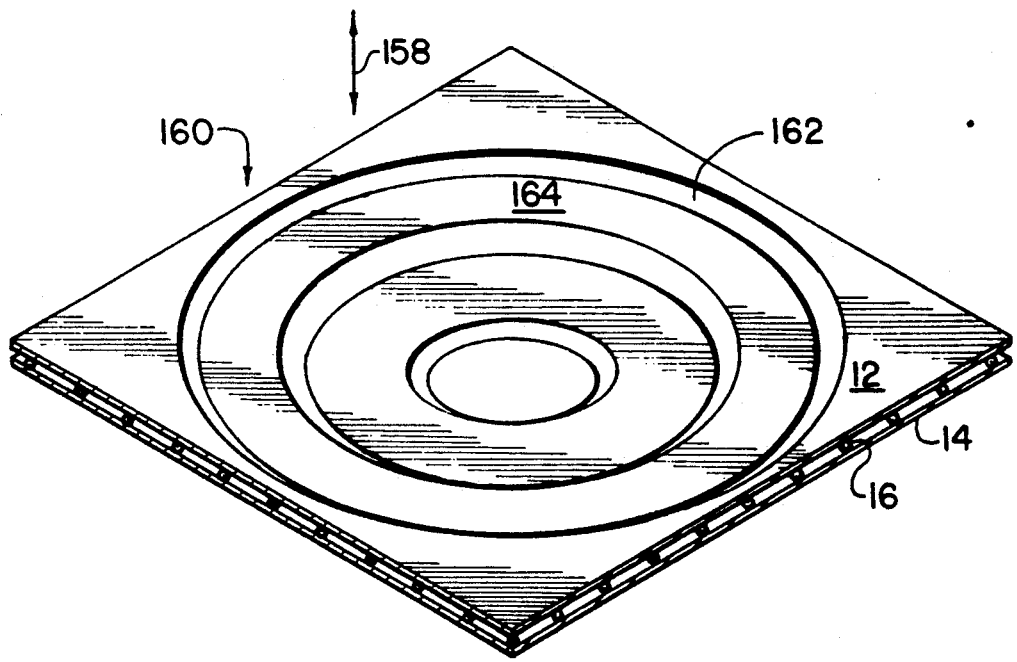
Figure 29:
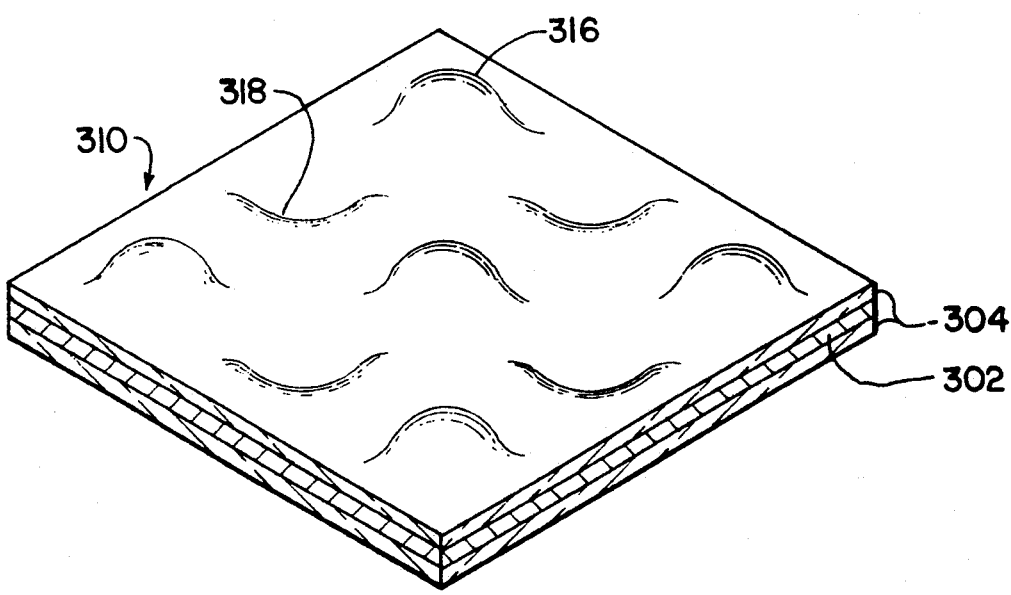
Figure 30:
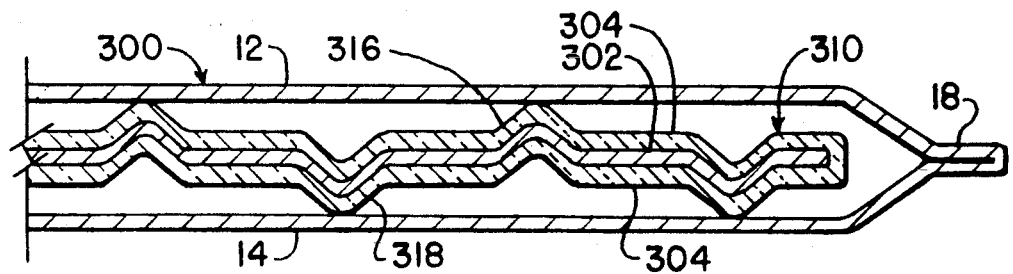
Figure 31:
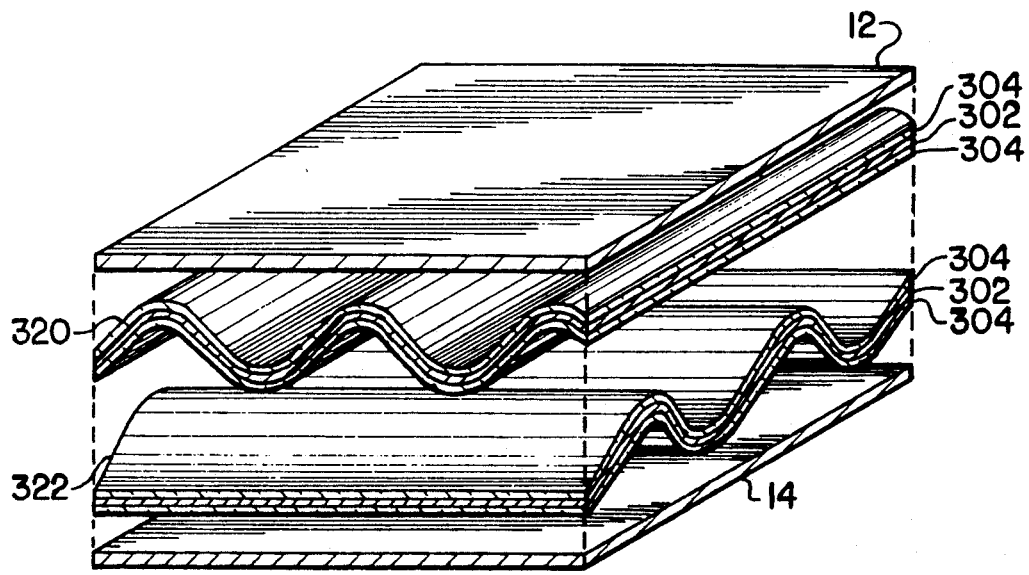

FIG. 26 is a perspective view of a segment of another embodiment insulation panel with pre-formed grooves to provide for expansion or contraction of the panel;

FIG. 27 is a perspective view of a segment of another embodiment insulation panel with a series of preformed, concentrically nested grooves;

FIG. 28 is a perspective view of the insulation panel of FIG. 25 with the preformed nested grooves deployed or expanded to create a bulge in the panel;

FIG. 29 is a perspective view of another embodiment spacer in the form of a sheet of porcelain enameled steel foil with alternating upwardly and downwardly extending dimples;

FIG. 30 is a cross-sectional view of the embodiment insulation panel using the sheet of the porcelain enameled steel foil spacer of FIG. 29;

FIG. 31 is a fragmented, exploded view of a panel assembled according to another embodiment wherein two corrugated webs of porcelain enameled steel foil are used as spacers.

DETAILED DESCRIPTION OF THE PREFERRED EMBODIMENTS

The basic ultra-thin insulation panel 10 embodiment according to this invention, as shown in FIG. 1 and in FIG. 2, which is a typical cross-section of the FIG. 1 structure, comprises two outer sheets or walls 12, 14 positioned in closely spaced-apart relation to each other. The seams around the edges of the panel where the two outer sheets or walls 12, 14 meet are sealed, as shown at 18. The seal 18 should be a metal-to-metal joint, such as a weld, although other metal-to-metal joints prepared by, for example, brazing, soldering, diffusion bonding, and the like. Therefore, for purposes of this invention, the term "weld" is used to include all such metal-to-metal seals or equivalents thereof.

The interior chamber 15 enclosed by the outer sheets or walls 12, 14 is evacuated to a high-grade vacuum in the range of at least $10^{-5}$ Torr, and preferably to the range of $10^{-6}$ Torr. To hold this high-grade vacuum for many years, the edge seams 18 have to be sealed with almost perfect leak-proof quality.

When the chamber 15 is evacuated as described above, the atmospheric pressure on the outsides of the wall sheets 12, 14 would normally collapse the wall sheets 12, 14 together, thereby causing a direct thermal conduction path or "thermal short circuit" from one wall to the other across the panel. To avoid such collapse, a plurality of discrete glass spacers, which can be in the form of spherical beads 16, are positioned optimally to provide mechanical support to hold the two wall sheets 12, 14 apart, while minimizing thermal conductance. It is preferred that the metal wall sheets 12, 14 be formed of a low thermal conductivity metal, such as stainless steel or titanium, both of which are easily weldable in a vacuum and are sufficiently hard or rigid so that they do not form around the spherical spacers, yet are bendable enough so the panel can be formed in curves. Therefore, a near "point" contact is maintained between each spherical glass bead spacer 16 and the metals wall sheets 12, 14. Other suitable metal for the wall sheets 12, 14 could include, for example, carbon steels, coated carbon steels, alloys, and the like. For high-temperature applications, the beads 16 can be ceramic beads instead of glass, so that they maintain their structural integrity, spherical shape, and near "point" contact with the metal walls 12, 14. Therefore, while this discussion, specification, and claims refer most often to the monolithic spacers as being glass, it is to be understood that ceramic spacer materials are also appropriate equivalents and are included within the scope of this invention.

Once the spacer beads 16 are properly positioned and the chamber 15 is evacuated, the atmospheric pressure on the outside surfaces of the wall sheets 12, 14 tightly squeezes or clamps the sheets 12, 14 against the bead spacers 16, thereby holding them in position. With proper spacing of the spacer beads 16, the insulation panel 10 can even be bent or formed around a curve, as shown in FIG. 1, and the spacer beads 16 maintain the spacing between the wall sheets 12, 14 in the bend without crimping or allowing a thermal short circuit between the two wall sheets 12, 14.

While there may be a number of ways to affix the spacer beads 16 in optimum spaced relation to each other in the chamber 15, one preferred method uses polystyrene or similar adhesive material and a bead jig. Other methods include securing the beads in place electro-statically. Also, the beads may be held in proper position by a metal mesh until the outer wall sheets 12, 14 are clamped in place, or they may be strung on wires or glass fibers.

Although the basic principles of the present invention have been described as spherical, other shapes and configurations are possible with this and all embodiments described herein. However, the preferred spacer shapes are those that form near point contact with the sidewalls 12, 14 to minimize thermal transfer between the spacers and sidewalls.

The magnitude of the vacuum and its coordination with the width of the vacuum chamber 15 in all the embodiments described above are important. Low-grade vacuums in the range of $10^{-7}$ atmospheres ($10^{-4}$ Torr) are inadequate to contribute significantly to the thermal transfer resistance or insulating quality of a panel, as illustrated in the graph of FIG. 3. The flat line 90 in the graph in FIG. 3 illustrates the point that a vacuum does not contribute to any decrease in the rate of thermal transfer across the panel at all until enough of the air (or other gases) has been withdrawn to the extent that the mean free path of a molecule between collisions with other molecules is equal to the spacing or distance between the hot and cold surface. For ultra-thin, high-grade insulation panels as contemplated by this invention, at a vacuum of about $10^{-4}$ Torr, the mean free path is equal to the distance between the two wall surfaces, as indicated by the bend 92 of the graph in FIG. 3. At that point, thermal conductivity of the panel 10 decreases, i.e., insulating effectiveness increases, on a fairly linear basis in direct relation to a decrease in gas pressure in chamber 15, as indicated by line 94 in FIG. 3. Then, at about $10^{-6}$ Torr, a further decrease in pressure does not significantly decrease thermal transfer, because almost all the thermal transfer in that range, indicated by line 96 in FIG. 3, is due to radiation. Therefore, in order to not only take advantage of a vacuum but also maximize the beneficial use of a vacuum in this kind of insulation application, it is necessary to maintain a high-grade vacuum with a pressure in the range of $10^{-6}$ Torr or lower.

The basic principles of this invention, as discussed above with respect to the basic embodiment 10, have applications to numerous other embodiments configured to enhance strength, flexibility, and insulating effectiveness. Some of these other embodiments 210, 230, 240, 250, and 260, as shown in FIGS. 4 through 11, have the two walls 12 and 14 textured with compression ribs or concave tension depressions.

In embodiment 210, shown in FIGS. 4 and 5, wall 12 is successively curved around one side of a row of the spacer beads 16 forming a ridge 225. The return of each successive curve forms concave depressions or troughs 212. Similarly, wall 14 is curved around the other side of the same row of spacer beads 16, forming concave troughs 214. These concave troughs 212, 214 allow a reduction in the spacing and number of spacer beads 16 while increasing the strength, structural integrity, and durability of panel 210. Embodiment 210 also enjoys increased thermal resistance, due to the reduction in the number of spacers 16. Most of the thermal conduction between walls 12 and 14 is the near "point" contacts 222, 224 of the spacer beads. Accordingly, reducing the number of spacer beads has reduced the number of "point" contact thermal conduction paths.

It is important to maintain minimal "point" contacts in embodiment 210, despite the depressions or troughs 212, 214, which if too deep would touch creating a thermal short circuit between walls 12 and 14. To prevent such a thermal short circuit, a space 226 must be maintained between walls 12 and 14 at troughs 212 and 214, for example, by maintaining radii 218 of internal arcs 215 at greater lengths than radii 216 of beads 16. Additionally, radii 218 are preferably offset from the center 220 of beads 16. The effect of arc radii 218 being longer than bead radius 216 and offset from bead center 220 is that internal arcs 215 somewhat encompasses bead 16 while still maintaining near "point" contacts 222 and 224 with walls 12 and 14, respectively. As mentioned above, this arrangement allows reduction in spacer beads 16 by increasing spacing between them, thereby increasing thermal resistance, lower costs, simplifying fabrication, and improving durability.

An advantage of embodiment 210 with its textured design is an enhanced ability to bend the CVI panel 210 in a direction normal to the direction of the concave troughs 212, 214, as shown in FIG. 6, while having a significantly increased structural resistance to bending in a direction parallel to the troughs 212, 214. This textured configuration allows easy forming of the insulation panel around, for example, cylindrical tanks and other planar surfaces that curve parallel to a longitudinal axis. The texture also reduces contact with a rigid, non-textured exterior or interior surface to essentially a number of line contacts, which further thermally isolates the object being insulated. In the case of insulated piping or ducting, such textured insulation panels will allow bonding of the piping or ducting while maintaining a very strong "hoop strength" design against collapse.

There is a tendency when panel 210 is bent that the inner concave trough, which for example, may be trough 214, will buckle and push in toward outer trough 212 faster than outer trough 212 is pulling away. This tendency may eventually result in a thermal short circuit between corresponding pairs of troughs 212, 214, thus significantly diminishing the panels insulating efficiency. Such an effect can be controlled easily by manufacturing those panels 210 that are intended to bend with different depths of troughs 212, 214 on opposite sides of the panel 210, so that the panel 10 can be bent easily in one direction as opposed to the other with little danger of thermal shorting. For example, the troughs 212 in sidewall 12 could be made not as deep as troughs 214 in sidewall 14. Therefore, bending the panel 210 toward the side of sidewall 12 so that the sidewall 12 becomes the inside sidewall of the resulting curved panel 210 can be done without thermal short circuit, because the more shallow troughs 212 will have less material to extend toward trough 214, while trough 214 will have more material to extend and make the longer, outer radius of the outer sidewall 14 in the curved configuration. Another alternative to further minimize the possibility of thermal shorting during bending is to make walls 12 and 14 of different materials having respectively different coefficients of elasticity and rigidity.

The overall thermal resistance of these insulation panels depends upon the degree of vacuum, as discussed above, and upon the contact thermal resistance at the near "point" contacts 222, 224. The contact resistance $R_{contact}$ can be expressed by the relationship $$R_{contact} = \frac{0.53}{K_c r_c}, \tag{1}$$

where $K_c$ is the material conductivity in the volume around the contact, and $r_c$ is the radius of the real contact between the spacer bead 16 and the sidewalls 12, 14. Metal typically has a thermal conductivity in the range of $K_m = 15$ W/m²K, and glass has a thermal conductivity in the range of $K_g = 1.5$ W/m²K. Metal having a thermal conductivity about ten times higher than glass dominates $K_c$ and therefore the conduction of heat in the vicinity of the contact. Accordingly, a glass-to-metal contact decreases the contact resistance by nearly a factor of ten compared to a glass-to-glass contact.

Such a glass-to-glass contact is found in embodiment 250, shown in FIG. 7. Embodiment 250 is similar to embodiment 210, with the same concave troughs 212, 214, and the similar arcs 215 on the insides of walls 12, 14 in the vicinity of, and somewhat around, the spacer beads 16. However, in embodiment 250, internal arcs 215 are filled with a glass or porcelain enamel 252. Such glass or porcelain enamel 252 may be similar to the porcelain used to coat common household appliances, such as stoves, ovens, and refrigerators. Glass spacer beads 16 in near "point" contact with glass enamel 252 create a glass-to-glass contact and increase the contact resistance $R_{contact}$ by nearly a factor of ten, as described above.

Further, as can be seen by a comparison of FIG. 7 with FIG. 5, the glass or porcelain fill material 252 in the interior troughs adjacent the glass beads 16 in the embodiment 250 of FIG. 7 significantly reduces the real contact radius r, because the exposed surface of the glass or porcelain fill 252 is much flatter than the inside surface of the troughs 215. Therefore, according to the same formula (1) above, the contact resistance $R_{contact}$ is further increased by the flatter surface of the glass or porcelain fill 252. Therefore, the overall increase in the contact resistance $R_{contact}$ from the glass or porcelain fill 252 in embodiment 250 may be greater than a factor of ten over the FIG. 5 embodiment.

As shown in FIG. 4, the concave troughs 212, 214 run parallel along the length of panel 210 (or panel 250) in a single direction. As already discussed, this configuration allows the CVI panel 210 or 250 to be bent in only one direction, normal to the direction of the concave troughs 212, 214. However, in embodiment 260, shown in FIG. 8, running the concave troughs in two directions allows the CVI panel 250 to be bent in two directions or biaxially. Panel 260 is similar to panels 210 and 250 with the same concave troughs 212, 214, and similar arcs 215 on the inside of walls 12, 14 around the spacer beads 16. However, in embodiment 260 there are additional concave troughs 262, 264, which run perpendicular to troughs 212, 214, but still along side spacers 16. In embodiment 260, these perpendicular troughs 16 create separate outward dimples 265 associated with each spacer bead 16, as opposed to the ridges 225 found in embodiment 210, and associated with a row of spacers 16. These perpendicular pairs of troughs, 212, 214 and 262, 264, as already mentioned have the added advantage of allowing panel 260 to be bent and shaped biaxially.

Of course, the advantages of the glass or porcelain fill material 252 in embodiment 250 is equally applicable to this embodiment 260 by filling the inside pockets of dimples 265 adjacent the beads 16 with the glass or porcelain material 252. While such fill material 252 is not specifically shown in FIG. 8, a cross-section of the FIG. 8 embodiment 260 with the glass or porcelain fill material 252 would look virtually the same as the cross-section of the embodiment 250 in FIG. 7.

The structure of another CVI panel embodiment, shown in FIG. 9, has the advantage of requiring fewer spacers 16, while maintaining or increasing the panel's strength according to the general principles of the present invention. In this embodiment 230 walls 12 and 14 are textured with outwardly convex compression bulges or ribs 232, 234, which not only increase the overall structural rigidity of the panel, but also provide additional compression strength to the sidewalls 12, 14 to resist deformation due to the compression pressure of the external atmosphere pushing the sidewalls 12, 14 toward each other against the resistance of spacer beads 16. Thus, fewer spacer beads 16 are required to maintain the structural integrity of panels 12, 14, thereby further reducing thermal conductivity through the panel via the spacers 16.

Similar to embodiment 210, embodiment 230 has walls 12, 14 curved with an inner arc 215 around spacer beads 16 such that near "point" contacts 222, 224 are maintained between walls 12, 14, and beads 16, respectively. However, rather than walls 12, 14 forming a smooth and continuous undulating curve as found in the previous embodiment 210, walls 12, 14 in embodiment 230 instead have a sudden change in direction at crimps 236, 238, which bubble back out forming the convex intermediate compression bulges or ribs 232, 234.

The cross-sectional view of FIG. 9 is also representative of an alternative configuration in which the outwardly convex bulges 222, 224 in adjacent sheets 12, 14 are hemispherical bubbles, rather than elongated troughs, with the spherical spacers 16 positioned in the pockets formed between two juxtaposed bulges 222, 224. Likewise, the smaller outwardly 727 convex bulges 232, 234 are hemispherical bubbles that perform the same compression resistant strength in the walls 12, 14 to resist deformation due to the atmospheric pressure on the exterior sides of walls 12, 14 as described above. As described above, this shape or texture of walls 12, 14 around beads 16 and chamber 15 provide increased thermal resistance, improved durability and lowered cost. Also, as described above, the advantages of the glass or porcelain fill material 252 of embodiment 250 can also be used with this embodiment to reduce thermal conductivity.

In another embodiment 240, according to the principles of the present invention, walls 12, 14 are textured with several divits 242, 244 interspersed between convex bubbles 246, 248, as seen in FIGS. 10 and 11. Divits 242, 244 are matched in pairs to retain spacer beads 16 therebetween. Convex bubbles 246, 248 similar to convex compression ribs 232 of embodiment 230, provide increased resistance to deformation of sidewalls 12, 14 due to atmospheric pressure on the outside and the vacuum on the inside of the panel 240. Therefore, as described for the embodiment 230 above, fewer spacers 16 are needed, thus decreasing thermal conductivity via the spacers 16 through the panel 240.

The convex bubbles 246, 248 may run parallel to each other along the length of panel 240 between divits 242, 244, in either direction, along either axis. Conversely, each of the convex bubbles 246, 248 may be an independent rise interspersed between a set of four adjacent divits 242 as in a quilted pattern, as opposed to being part of a rib that extends the length of panel 240. In such a quilted pattern, as illustrated in FIG. 10, the divits 242 run the length of panel 240 forming a network of channels 245. Similar to embodiment 260 in FIG. 8, this quilted pattern in embodiment 240 has the advantage of being able to bend biaxially in either direction. This embodiment 240 has an additional advantage over previous embodiments 210 and 230 in that when bent there is not the likelihood of forming a thermal short circuit between walls 12 and 14, since the bending would tend to flatten the bubble, for example 246, on the outer wall 12 and force the inner bubble, 248 on wall 14 out and away from wall 12 even further.

Benefits of the textured shaping in embodiments 210, 230, 240, 250, and 260, as described above, include reduction in the number of spacers 16 which increases the panel's thermal resistance. Further, this texturing creates a structurally stronger CVI assembly which results in improved durability. Also, the texturing makes for a much more simplified fabrication process with easier welding fit-up resulting in lowered production costs and increased output. Finally, the additional strength resulting from the texturing allows a broader selection of steels or similar materials to fabricate walls 12, 14, also resulting in lowered costs and increased flexibility with respect to selection of raw materials for production.

Although textured embodiments 210, 230, 240, 250, and 260 were described using spacer beads 16, these embodiments are equally applicable to utilization with other shapes and configurations of spacers, such as spacer sheets with spherical nodules. It is further possible with several of the embodiments to have spacers on a sheet in the form of ribs with circular or triangular cross-sections which form near "line" contacts with the interior surfaces of a wall sheets 12, 14.

Spacer sheets and spherical nodules could be formed from a single contiguous piece of glass or ceramic (not shown), or be in the form of glass beads 16 attached to a thin metal foil web 102 as in embodiment 100 illustrated in FIGS. 12 through 19. The web of thin metal foil 102 can be perforated with a hole, which, for example, could be a star-shaped hole 104, as shown in FIG. 15, at each place where it is desired to retain a glass bead. The glass bead 16, as best seen in FIGS. 14, is then positioned in the hole 104 and retained there by the plurality of tines 106, 108 that project radially inwardly from the periphery of hole 104. The radius 110 of hole 104 should be about equal to, or slightly larger than, the radius of spherical beads 16 to ensure that a bead 16 can fit and be retained within a hole 104. The beads 16 are preferably retained in holes 104 by a plurality of tines or prongs 106, 108 projecting from the periphery of hole 104.

In one preferred embodiment of this structure, as shown in FIG. 15, a plurality of longer tines 106 are alternatingly interspersed with a plurality of shorter tines 108. These tines 106, 108 may alternatingly be deflected upwardly and downwardly such that, for example, longer tines 106 are deflected upwardly and shorter tines 108 are deflected downwardly, thereby entrapping and retaining a spherical glass bead 16 within hole 104, as shown in FIGS. 12, 13, and 14. Accordingly, insulation panel 100 provides a convenient and practical method of placing and retaining the discrete beads 16 between the sidewalls 12, 14.

It is preferred that tines 106 and 108 be shorter in length than the radius 110 of hole 104, such that the tips of the tines do not meet in center of hole 104. This structure ensures that when panel 100 is fully constructed, as shown in FIG. 13, with beads 16 entrapped in web 102 and compressed between outer sheets 12 and 14 that tines 106, 108 do not touch sheets 12 or 14 so that the only path for thermal conduction between sheets 12 and 14 is still the "point" contact between bead 16 and wall 12,14, the advantages of which are discussed above, and not through the tines 106, 108.

One method of inserting beads 16 into web 102 is illustrated in sequential FIGS. 16a and b through 19a and b and requires tines 108 to be shorter than tines 106, as has been referred to above. In these sequential FIGS. 16a and b through 19a and b, the "a" figures represent the cross-sections taken along the lines a—a of FIGS. 14 and 15 through the longer tines 106, and the "b" figures represent the cross-sections taken along the lines b—b of FIGS. 14 and 15 through the shorter tines 108.

Initially in this insertion method, a bead 16 is brought toward web 102 such that it just begins to make contact with web 102 at a hole 104, as shown in FIG. 16a and 16b. At this initial position, bead 16 has made contact with long tines 106, as illustrated in FIG. 16a, but has not yet proceeded far enough to make contact with short tines 108, as illustrated in FIG. 16b.

Bead 16 is then pressed farther toward web 102 in an upward direction, as viewed in sequential FIGS. 16a and b through 19a and b by a force represented by arrows 112. Force 112, which must be external to the system to deflect tines 106, 108, may be the same force that initially brought bead 16 into contact with web 102, but doesn't necessarily have to be. At this point, bead 16 forces the long tines 106 to deflect upwardly ahead of the bead 16, as illustrated in FIG. 17a. At the same time, bead 16 has then also contacted short tines 108 and has begun to also deflect them upwardly, as illustrated in FIG. 17b. However, because tines 108 are shorter than tines 106, they are not deflected as much as tines 106, as can be seen by comparing FIGS. 17a and 17b.

By force 112 continuing to press bead 16 into hole 104 of web 102, bead 16 eventual reaches the point where its diameter causes maximum deflection of long tines 106, as illustrated in FIG. 18a. At this same position, the shorter tines 108 have cleared the widest portion of spherical bead 16, and they are resilient enough such that they have returned or snapped back to their original undeflected positions, as shown in FIG. 18b.

Once shorter tines 106 have returned to their undeflected positions, the upward force 112 on bead 16 can be replaced with a slight downward force, indicated at arrow 114 in FIGS. 19a and 19b. Downward force 114 causes bead 16 to somewhat regress back into hole 104, thereby partially restoring long tines 106 from their previous positions of maximum deflection to a position of somewhat lesser deflection, as shown in FIG. 19a. Downward force 112 does not necessarily have to be external to the system, because, in the absence of any deflection of the short tines 108, the natural resilience and resulting restoring force of deflected long tines 106 might provide sufficient force to return bead 16 toward hole 104. This downward movement of bead 16 then causes a reverse deflection of short tines 108, as shown in FIG. 19b. When an equilibrium is reached between the downward restoring force of long tines 106 and the upward restoring force of short tines 108, the spherical bead 16 will be entrapped and retained within web 102 in a hole 104.

Sheets of web material 102 may be manufactured according to these same principles of this invention, for example, by running a continuous sheet of thin steel foil 120 in the direction of arrow 121 through a perforating roller die 122 rotating in the direction of arrow 123, as shown in FIG. 20. Perforating roller die 122 perforates foil 120 with a plurality of star-shaped holes 104 having longer tines 106 and shorter tines 108, as described above and shown in FIG. 15. The perforated sheet 120 is then flooded at a station 124 with numerous spherical beads 16. This perforated sheet 120, which now essentially has a monolayer of spherical beads 16, is then passed through a pair of soft rubber rollers 126, 128 rotating as shown by arrows 125, 127, which cooperate together to press beads 16 into holes 104 to entrap and retain them as described above. Excess beads 16' may then either be removed or simply allowed to roll off the now bead-embedded sheet 120. Finally, bead-embedded sheet 120 may be cut into the desired shapes and sizes for the webs 102 for specific insulation panels 100, as shown in FIGS. 12 and 13.

Although embodiment 100 with its web 102 has been described with spherical bead spacers 16, many other shapes, and configurations are possible, such as, for example, polyhedrons, circular or diamond shaped rods and the like (not shown). These and many other configurations are possible while still retaining the principles of the present invention, as described above, and are included within the scope of this invention.

It is possible to increase the strength, aesthetics and range of applications of a typical CVI insulation panel 142 produced according to the teachings of the present invention by laminating panel 142 with a superstrate 144, as in embodiment 140 shown in FIG. 21. Typical CVI insulation panel 142 of this superstrate embodiment 140 may be any of the various panel embodiments described herein. For the sake of example, panel 142 is shown simply containing the same spacer beads 16 which have been selectively spaced between textured or shaped walls 12 and 14 to provide mechanical support in the presence of a high-grade vacuum as is common to the previous embodiments. Superstrate 144 may be any applicable material which enhances any desired characteristic of the CVI panel 142, such as wood, which has a relatively low thermal conductivity itself, plastic, foam, or the like.

In general, some of the advantages of laminating panel 142 with a superstrate 144 include the possibility of allowing metal walls 12 and 14 to be thinner, thereby saving weight and possibly lowering the cost of production. Of course, the additional strength and resistance to deformation added by the wood or other laminate superstrate 144, such as metal, a cementitious material, or ceramic, also makes it feasible to reduce the number of spacers 16, thereby decreasing the thermal conductivity. Some superstrates or combinations of superstrates can protect CVI panels 142 from temperature extremes. Additionally, some superstrates provide CVI panels 142 with enhanced aesthetics necessary for applications in which the CVI panel will be exposed such as in commercial construction.

More specifically, superstrate 144 may be, for example, wood, wood products, or polymers. If superstrate 144 is a wood or wood product, it can provide additional thermal resistance. Further, a wood superstrate allows the possibility of either smooth or carved surfaces and the natural appearance of wood will increase the aesthetics for such uses as doors and other construction uses. Wood can also add additional strength to panel 142. On the other hand, a superstrate 144 made out of polymers can be provided with various surface appearances and treatments that are very controllable within the capabilities in polymer forming arts. Additionally, polymers provide greater resistance to water rot, mildew, and corrosion than would be available from some other superstrates or in the absence of any superstrate.

In some applications wherein a structural steel or other metal or metal alloy panel is required for strength, but which also has to be insulated, such a structural insulated panel 170, as shown in FIG. 22, can be made according to this invention. In this structural insulated panel embodiment 170, the structural substrate 172 can be, for example, a thicker steel or other metal sheet having sufficient strength to function in its intended application, such as a steel building wall, a refrigerator wall, an aircraft fuselage skin, or the like. The glass spacers 16, with or without the webbing described above and shown in FIGS. 12 and 13, can be positioned on a surface of the structural substrate 172, with a thin outer wall 12 positioned against the spacers 16 to enclose the vacuum chamber 15. The only difference between this structural insulation panel embodiment 170 and a typical compact vacuum insulated panel, such as embodiment 10 shown in FIGS. 1 and 2, is that one wall 172 in panel 170 is a thicker, structural member, rather than having the two thin sheet walls 12, 14 of panel 10.

Of course, such a structural insulated panel can also have the thin wall sheet 12 shaped or corrugated in any of the configurations described above for embodiments 210, 250, 260, 230, or 240. For example, such a structural insulated panel embodiment 274 is illustrated in FIG. 23 with a corrugated thin wall sheet 12 with glass liners 252 similar to that shown in embodiment 250 of FIG. 7 separated by glass spacer beads 16 from the thicker structural substrate 172 to form the vacuum chamber 15.

The embodiment 276 illustrated in FIG. 24 is similar to embodiment 274 in FIG. 23, except that it has an additional intermediate partition sheet 280 positioned between the thin outer sheet 12 and the thicker substrate 172. This intermediate partition sheet 280 can be shaped and structured much like the outer sheet 12, including being corrugated for added strength and with glass liners 252 to minimize heat conduction, or any of the other flat, textured, or other suitable configurations is described above. In this embodiment, the first layer of spacer beads 16 are positioned between the intermediate sheet 280 and the substrate 172, and an additional row of spacer beads 286 are positioned between the intermediate sheet 280 and the outer sheet 12. The peripheral edge 282 of outer sheet 12 is welded to the substrate 172 to form the seal 18, thereby defining the vacuum chamber 15 between outer sheet 12 and the substrate 172. Since the portions 285, 287 of the vacuum chamber 15 above and below the intermediate sheet 280, respectively, are a common chamber in this embodiment 276, the primary functional purpose and benefit of the intermediate layer 280 is for reflecting infrared radiation. Therefore, the intermediate layer 280 is preferably made with shiny, reflective surfaces. Of course, a plurality of such intermediate sheets 280 and additional spacer beads 286 can be layered above the substrate 172 to provide more than one additional reflective surfaces.

For even more insulation effectiveness, the intermediate layer 280 can be made of metal and joined or sealed at its peripheral edge 283 by welding, such as at 18, to the peripheral edge 282 of the outer sheet 12 and the substrate, as shown in the embodiment 278 in FIG. 25. Consequently, the chamber portion 285 above the intermediate sheet 280 forms a separate and distinct vacuum chamber from the chamber portion 287 below the intermediate sheet 280. As a result, in addition to the added benefit of the intermediate sheet 280 functioning as an infrared reflective layer, as described above for embodiment 276, the insulating effect of the panel 278 is substantially increased by the two vacuum chambers 285, 287 layered over the substrate 172. Of course, a plurality of additional intermediate sheets 280 and layered vacuum chambers can be formed in this manner to further increase the insulating effect.

In addition to the bendability of embodiments 210, 230, 240, 250, and 260, discussed above, it is occasionally desirable to modify the shape of an otherwise rigid CVI panel or simply to allow for linear expansion and contraction of a given CVI panel, for example where temperature variations might cause the panel to thermally expand or contract. To achieve selective shaping or to accommodate this expansion and contraction, an extension panel 150 may be provided with pre-formed expansion grooves 152, as shown in FIG. 26. Embodiment 150 is still made according to the principles of the present invention, as enumerated above, including spacers 16, selectively spaced to provide maximum mechanical support against collapse of sidewalls 12 and 14 under evacuation to a high-grade vacuum, while still providing minimal thermal conductivity.

Expansion groove 152 allows for linear expansion or contraction of panel 150 in the directions indicated by double-headed arrow 156, most probably in association with the expansion and contraction of whatever material or structure the panel 150 may attached to or associated with. Additionally, grooves 152 may provide a pre-score for ease in bending at preferred, predetermined locations, and they can accommodate some bending to allow some transverse deformation of the panel 150, as indicated by arrow 158. Such transverse deformation capability offers some particular advantages in special embodiments described below. Grooves 152 also reduce the need for spacers in those regions of rigidity 154 between grooves 152 due to the additional resistance to collapse of walls 12 and 14 provided by grooves 152.

In addition to the linear expansion and contraction movement in a lateral direction 156, a series of grooves 162, similar to grooves 152, can be specially provided and shaped relative to a panel 160, constructed similarly to panel 150, to provide pre-defined portions or regions, which may selectively be pushed out in a transverse direction 158 normal to rigid surfaces 164 to form a bulge or depression, as illustrated in FIGS. 27 and 28. Then at some later time the bulge or depression may even be selectively pushed or snapped back. The relative direction of movement in pressing out to the expanded position and its possible subsequent return to a normal flat position is indicated by double headed arrow 158. In the example of this kind of application shown in FIGS. 27 and 28, grooves 162 of a pre-formed panel 160, as described above, are formed as a nested series of concentric circular grooves 162. FIG. 27 shows panel 160 in its normal, flat position. If desired, the midportion of the panel 160 defined by the concentric grooves 162 may be pressed outwardly in the direction of arrow 158 into a convex, bulged configuration, as shown in FIG. 28.

Of course, the nested configuration of grooves 162 does not have to be circular or concentric. Other nested configurations will also function as described, but may result in a differently shaped bulge. For example, an oval configuration of grooves (not shown) would result in an oval-shaped bulge, and somewhat eccentrically positioned grooves may accommodate a bulge that is deeper in some portions than others.

The beads 16 according to this invention are preferably fabricated of glass for applications where temperatures are less than 400° C. for a number of reasons, the most important of which is the very low outgassing characteristic of glass. Glass also has a high compressive strength, mechanical rigidity, low thermal conductivity,.and low cost, and it is easy to use in fabrication. As an alternative, the spacers 16 can be spherical metal balls coated with a porcelain enamel, which is a form of glass material. In applications where temperatures exceed 400° C., the beads 16 can be fabricated with a ceramic material. Therefore, while glass, metal coated with porcelain enamel, and ceramics all have some individually unique characteristics, they are all considered to be within a range of equivalents for the purposes of this invention.

However under certain circumstances glass beads may be deemed too difficult to handle, to position, and to maintain in the positions and spacial relationships described above, or too fragile. Accordingly, as a possible alternative to spacers formed from glass or ceramic beads, a continuous sheet of shaper metal may be provided, such as, for example, the spacer 310 illustrated in the compact vacuum insulation panel embodiment 300 shown in FIGS. 29 and 30. To make metal sheet 310 appropriate as a spacer, according to the principles of the present invention, it should have a plurality of discrete, spaced apart structures for holding metal sidewall sheets 12, 14 apart, and those structures should have lower thermal conductivity than metal sidewall sheets 12, 14 and minimal, preferably point or "near point", contact with metal sidewall sheets 12, 14. The spacer 310 can include a substantially planar shaped body or web portion 315, but including a plurality of rigid protrusions extending in opposite directions from the planar body or web 315, and there should be a layer of material between the protrusions and the sidewall sheets 12, 14 of the panel 300 that has a thermal conductivity lower than the thermal conductivity of the metal sidewall sheets 12, 14. For example, the protrusions can be in the form of the upward bulges 316 and downward bulges 318, which extend out from the plane of main body or web 315 of sheet 310. The bulges 316, 318 provide the same mechanical support to prevent collapse of metal sheets 12 and 14 in the presence of a high-grade vacuum that beads 16 did in previous embodiments, but the body or web portion 315 sets and maintains the relative positions or spacings between the protrusions or bulges 316, 318, as can be seen in FIG. 30. For example, a suitable manner of providing the bulges 316, 318 is shown in FIG. 29 where the bulges 316, 318 are deformations in a substrate body or web 315 that result in some of the web material being bulged out of the plane of the main body or web 315 leaving a corresponding dimple in the side of the web 315 that is opposite the bulge 316, 318. When the substrate body 315 is constructed with a rigid material so that the bulges 316, 318 do not collapse, the bulges 316, 318 provide the structural support to hold the sidewalls 12, 14 apart, as shown in FIG. 30, although any structure that has protrusions for holding the sidewalls 12, 14 apart and a web for spacing or setting the relative positions of the protrusions will work.

As also shown in FIG. 30, a layer of low thermal conductivity material, i.e., lower in thermal conductivity than the steel sidewalls 12, 14, such as porcelain enamel 304, is preferably positioned between the protrusions 316, 318 and the metal sidewalls 12, 14. Sheet 310 can be formed from a thin sheet of substrate 302 comprising a metal, such as steel, and preferably coated on both sides with porcelain enamel 304. Porcelain enamel 304, but at least the portions of the protrusions 316, 318 that contact metal sidewall sheets 12, 14 should be coated with the porcelain enamel 304 is essentially a glass formulated to have compatible thermal expansion to the substrate 302, and it bonds tightly to the substrate 302 to provide a hard, smooth surface with very low thermal conductivity. Porcelain enameled steel also has a high throughput in mass production procedures know commonly in the industry. Accordingly, porcelain enameled sheet 310 may be manufactured as a porcelain enameled steel foil the same as or similar to the porcelain panels used to coat common household kitchen appliances such as stoves, ovens, and refrigerators, but preferably much thinner for purposes of this invention. Of course, other glassy materials, such as silicon dioxide or even ceramics that have low thermal conductivity can also be used as the coating material instead, or in addition to, porcelain enamel.

Spacer sheet 310 may also be formed with numerous other possible shapes to provide the spacing and necessary strength to maintain separation between walls 12 and 14. For example, spacer sheet 310 may be constructed with elongated ridges extending outwardly from a main body. Similarly, these porcelain sheets may also be formed as corrugated sheets 320, 322, as seen in FIG. 31. Sheets 320, 322 may be used as spacers according to the principles of the present invention either singularly or in combination with each other with their corregation ridges running perpendicular to each other, as shown in FIG. 31. Sheets 320, 322 may be the same porcelain enameled steel foil as described above.

Optical rejection of heat with the present invention can be enhanced by including low-emissivity coatings 17, 19 of copper, silver, or other low-emissivity material, preferably on the interior surfaces of wall sheets 12, 14, as shown in FIG. 1. Although, this low-emissivity coating 17, 19 is not illustrated in all the figures representing the various embodiments, of this invention, its use is equally applicable to all such embodiments, including on the porcelain enameled surfaces described above.

A metal getter 21, illustrated in FIG. 2, can also be placed in the chamber 15 of any of the panel insulation embodiments described above (although not illustrated in all the figures) prior to evacuating and sealing the chamber 15. The metal getter 21 traps any small amount of reactive gas desorbed from glass beads or metal walls that may occur during the lifetime of many years duration.

For purposes of illustration and not for limitation, the ultra-thin insulation panels according to this invention can be fabricated very effectively and used very beneficially in overall thickness in the range of about 0.1 inch (2.5 mm). The thin metal wall sheets 12 and 14 can be preferably in the range of 0.005 to 0.010 inches (0.2 to 0.3 mm) or possibly even 0.004 to 0.025 inches (0.1 to 0.6 mm) thick, and the spacers can be about 0.08 inch (2 mm). Of course, in the case of panel embodiment 170 in FIG. 22, only the one thin metal panel or sidewall 12 would be in this thickness range, and the other panel substrate or sidewall 170 could be virtually any thickness necessary to develop the structural strength required by a particular application, as discussed above for that embodiment. In the case of embodiment 100, the thin metal foil 102 can be on the order of 0.001 to 0.003 inches (25 $\mu$m to 75 $\mu$m). Gas-phase conduction is nearly eliminated by sealing the chamber 15 under a high-grade vacuum with a pressure of $10^{-5}$ Torr and preferably $10^{-6}$ Torr or less, as illustrated by FIG. 3 and discussed above. Solid-phase conduction is minimized by the use of low thermal conductivity material, such as glass, for mechanical side wall supports or spacers and by the use of nearly "point" contacts between the supports and the wall sheets, as described above in relation to the specific structures and embodiments illustrated. A 0.1-inch (2.5 mm) thick insulation panel, as described above, can have an insulation value as high as R15, i.e., R=15° F.−hr. ft²/BTU, which resists thermal transfer as well as a 2¼ inch thick section of polymer foam or nearly seven inches of standard-density fiberglass.

By way of illustration, and not of limitation, the following discussion is provided to illustrate the advantages of the ultra-thin Compact Vacuum Insulation (CVI) embodiments of the present invention such as its compactness, effective working temperatures, light weight, and reduction in the use of chlorofluorocarbons (CFCs).

In many applications a premium is paid for volume, and a high-performance insulation material occupying less volume is therefore more valuable. An indicator of these applications is provided by the growing substitution of more-expensive expanded foam products with R-values of 5 to 10 per inch, or other exotic insulations, for less-expensive bulk insulations such as fiberglass, rockwool and cellulose, with R-values of 2 to 4 per inch. Such applications can include, for example: refrigerators; freezers; display case shells for chilled products such as meat, produce, flowers, and liquor; refrigerated intermodal transport containers; refrigerated truck trailers, tank, and rail cars; steam and hot and cold water piping, and storage facilities; district heating and cooling piping, and other transport passages; industrial process hot and cold storage tanks or containers; industrial hot and cold process equipment; automobile, train, plane and ship body shells; building HVAC equipment and ducts; roofs, walls, and floors of buildings; chilled computer circuits and components; diurnal and annual cycle storage tanks; portable hot and cold storage and transport containers; road and bridge decks; protective apparel, such as boots, hats, and coats; thermal isolation of heat-producing computer components and other operations; and, temperature maintenance of high temperature processes such as combustion, sodium-sulfur batteries, and heat-retention diesels.

The ultra-thin CVI insulation panels according to this invention as described above are just as effective in cryogenic processes, transport, and storage situations as the thicker, more complex, state-of-the-art cryopumped insulation, where a layered multifoil insulation is continuously vacuum-pumped by thermal absorption by the extremely cold material itself. However, since the ultra-thin CVI insulation panels and conduits of the present invention do not rely on such cryopumping to maintain their insulation effectiveness, they do not require such energy input or waste. In further contrast, this insulation according to the present invention is also just as effective in ambient and high-temperature applications as it is in low-temperature applications, whereas cryopumped insulation works only at extremely low temperatures, and the ultra-thin CVI of the present invention is much less bulky and more flexible than cryopumped insulation.

Related to this cryogenic application is the case of high-temperature superconductors. As long as superconductivity took place only at cryogenic temperatures, superconductive transmission of electricity was through circuits that cryo-pumped their multifoil insulating jackets. Such energy drain due to cryo-pumping the insulation could be substantial when cryo-pumping great lengths of superconductor circuit. Such energy drain could be avoided with the ultra-thin CVI insulation of the present invention, as discussed above. Equally as important, however, is the current on-going development of superconductors that operate above cryogenic temperatures, yet still need effective insulation. Since cryopumping does not occur at higher temperatures, the ultra-thin CVI insulation of this invention may be the only available practical compact insulation alternative.

Benefits of the relatively lighter weight of the embodiments of the present invention over prior art insulating materials and techniques include: lighter-weight, less-expensive machinery is required for fabrication and handling; lighter-weight fasteners are required for attachment to other structures; lighter-weight structures are required to hold the present invention; and less fuel and effort is required to transport the embodiments, fasteners, and accompanying structure, if any, to which it is attached or upon which it rests.

By way of further example, existing and prospective insulation products are compared to an embodiment of the present CVI invention for use in a refrigerator/freezer (R/F) in the following table:

|  | lb/ft$^3$ | lb/R15/Ft$^2$ | Weight (lb) of R15 Insulation-only in Prototype R/F | Volume (ft$^3$) of R15 Insulation in Prototype R/F |
|---|---|---|---|---|
| Loose-fill fiberglass (R3) | 2 | 0.83 | 35.3 | 17.50 |
| Polyurethane foam (R7) | 2 | 0.35 | 14.9 | 7.70 |
| Perlite powder (in atm. R2.5) | 14 | 7.00 | 297.5 | 21.30 |
| Optimized mixed powder (at 0.1 mm Hg. R20) | 15 | 0.97 | 41.2 | 21.30 |
| CVI (at 10$^{-6}$ torr) | N/A | 0.60 | 24.0 | 0.35 |

Another advantage of the advanced insulation according to this invention is provided by the growing body of evidence that a chemical constituent of the best low-cost insulations currently available, i.e., the expanded polymer foams, is damaging the earth's protective ozone layer. The chlorofluorocarbons (CFCs) used to blow (expand) the foam escape from the foam over time, gradually rising to the stratosphere where, over a 50-year life, they act as a catalyst in destroying 50,000 times their weight in ozone.

Besides the present invention being a direct substitute in many applications for CFC-blown insulating foams, its other, attributes of light weight, compactness, non-flammability, non-toxicity, low cost, etc., make it beneficial to increase the R-values presently utilized in appliances and other applications, as well as those now being proposed. In the many cases where the thermal envelope is enclosing spaces of products chilled by standard vapor-compression equipment with CFC working fluid, or refrigerant, the present invention allows for a down-sizing of the vapor compression equipment, and a resulting reduction in the amount of CFC refrigerant, as well as energy, needed to achieve and maintain the desired cool or chilled temperatures in the enclosed spaces. With the reduction of CFCs in compression equipment combined with replacement of CFC-emitting materials with CVI as insulation, refrigeration equipment and other CFC insulation methods can be eliminated as a major source of CFC pollution.

One such major source of CFC pollution is the building industry, where CFC-blown foam is used to fill concrete masonry blocks to meet ASHRAE 90.1P Building Energy Standards. Ten years of research has not yet yielded a concrete masonry block with an R value of 10. In the absence of an R10 concrete masonry block, the insulating efficiency of these construction blocks have been supplemented with CFC-blown foam. However, in view of the environmental damage from CFC pollution discussed above, the present invention would make a very effective direct substitute for CFC-blown insulating foams in the construction industry. The ultra-thin CVI insulation panels of the present invention could be surface-mounted to existing blocks, integrated into new block designs, or inserted in the wythes between exterior and interior block walls.

A further advantage of the ultra-thin CVI insulation panels of the present invention is their application as a motor vehicle battery case. The power availability of batteries decreases with lowered temperatures. Accordingly, insulating motor vehicle batteries with ultra-thin CVI insulation panels will significantly improve the durability and life of the batteries. Additionally, the CVI insulation panels, with their light weight, compactness, and low cost, will allow for effective insulation of motor vehicle batteries, without significant increases in size, weight, or cost over current batteries. These ultra-thin CVI panels could be surface mounted to existing battery cases, formed into a battery enclosure, or integrated within new battery case materials.

The foregoing description is considered as illustrative only of the principles of the invention. Further, since numerous modifications and changes will readily occur to those skilled in the art, it is not desired to limit the invention to the exact construction and processes shown as described above. Accordingly, all suitable modifications and equivalents may be resorted to falling within the scope of the invention as defined by the claims which follow.

The embodiments of the invention in which an exclusive property or privilege is claimed are defined as follows:

1. A thermal insulating panel comprising two hard metal sidewalls positioned in closely spaced apart relation to each other and welded together around their edges to enclose a vacuum chamber therebetween, said chamber being evacuated, and a spacer positioned in said chamber between said two sidewalls for bracing said two sidewalls apart, said spacer comprising a thin substrate sheet having a plurality of protrusions extending transversely outward in opposite directions from opposite surfaces of said substrate sheet, and a layer of material having a lower thermal conductivity than said metal sidewalls positioned between said protrusions and said metal sidewalls.

2. The thermal insulating panel of claim 1, wherein said substrate sheet is corrugated to form said protrusion in elongated, parallel, alternating troughs and ribs.

3. The thermal insulating panel of claim 1, wherein said substrate sheet is rigid.

4. The thermal insulating panel of claim 1, wherein said substrate sheet is monolithic.

5. The thermal insulating panel of claim 1, wherein said material is a glassy material.

6. The thermal insulating panel of claim 5, wherein said glassy material comprises porcelain.

7. The thermal insulating panel of claim 5, wherein said glassy material comprises silicon dioxide.

8. The thermal insulating panel of claim 5, wherein said glassy material comprises a ceramic material.

9. The thermal insulating panel of claim 1, wherein said substrate sheet is substantially entirely coated with said layer of material.

10. The thermal insulating panel of claim 9, wherein said substrate sheet is comprised of a rigid metal.

11. The thermal insulating panel of claim 10, wherein said substrate sheet is monolithic.

12. The thermal insulating panel of claim 10, wherein said protrusions are deformations in said substrate sheet.

13. The thermal insulating panel of claim 12, wherein said deformations in said substrate sheet are in the form of bulges on one side of said substrate sheet with corresponding dimples on the opposite of said substrate sheet.

* * * * *